(12) United States Patent
Okawa et al.

(10) Patent No.: US 8,564,215 B2
(45) Date of Patent: Oct. 22, 2013

(54) LIGHT EMITTING MODULE DEVICE, LIGHT EMITTING MODULE USED IN THE DEVICE, AND LIGHTING APPARATUS PROVIDED WITH THE DEVICE

(75) Inventors: Masanao Okawa, Nara (JP); Hirofumi Konishi, Hirakata (JP); Shohei Yamamoto, Burlington, MA (US); Kentaro Yamauchi, Osaka (JP)

(73) Assignee: Panasonic Corporation, Osaka (JP)

( * ) Notice: Subject to any disclaimer, the term of this patent is extended or adjusted under 35 U.S.C. 154(b) by 155 days.

(21) Appl. No.: 13/379,128

(22) PCT Filed: Sep. 9, 2010

(86) PCT No.: PCT/JP2010/065543
§ 371 (c)(1),
(2), (4) Date: Dec. 19, 2011

(87) PCT Pub. No.: WO2011/037024
PCT Pub. Date: Mar. 31, 2011

(65) Prior Publication Data
US 2012/0098451 A1    Apr. 26, 2012

(30) Foreign Application Priority Data

Sep. 25, 2009  (JP) ................................. 2009-221012
Sep. 25, 2009  (JP) ................................. 2009-221025
Sep. 25, 2009  (JP) ................................. 2009-221039

(51) Int. Cl.
*H05B 37/02*    (2006.01)
(52) U.S. Cl.
USPC ............................. 315/210; 315/313; 315/161
(58) Field of Classification Search
USPC .............. 315/160–166, 167, 169.1, 210, 211,
315/215, 217, 312–313, 317–320, 322
See application file for complete search history.

(56) References Cited

U.S. PATENT DOCUMENTS

| 6,236,167 B1 * | 5/2001 | Yamaguchi et al. ....... 315/169.2 |
| 6,587,087 B1 | 7/2003 | Ishizuka |
| 6,794,823 B2 * | 9/2004 | Ito et al. ..................... 315/169.3 |

(Continued)

FOREIGN PATENT DOCUMENTS

| JP | 59-24891 | 2/1984 |
| JP | 4-368991 | 12/1992 |

(Continued)

*Primary Examiner* — James H Cho
(74) *Attorney, Agent, or Firm* — Greenblum & Bernstein, P.L.C.

(57) ABSTRACT

A light emitting module device includes: a power line through which power is supplied to light emitting modules; and a signal generation circuit which generates a control signal. The power line is shared by a plurality of the light emitting modules, and has switches and switches which turn on or off current conduction to the light emitting modules, through open/close operations. The signal generation circuit individually controls the switches and the switches. The open/close operations include a light-emission period in which the light emitting module emits light; and an extinction period in which the light emitting module is extinguished, and if there is a control signal to be transmitted to the light emitting module, the control signal is superimposed onto supply power. Since a control signal is superimposed onto supply power to each light emitting module, the light emitting modules can be individually controlled. In addition, since the power line can be used also as a communication line, and the power line can be shared by a plurality of the light emitting modules, the number of lines can be decreased.

19 Claims, 16 Drawing Sheets

(56) References Cited

U.S. PATENT DOCUMENTS

| | | |
|---|---|---|
| 7,348,738 B2 | 3/2008 | Foust et al. |
| 2005/0248935 A1 | 11/2005 | Strip et al. |
| 2010/0103089 A1* | 4/2010 | Yoshida et al. ............... 345/102 |
| 2012/0032615 A1* | 2/2012 | Kikuchi et al. ............... 315/320 |

FOREIGN PATENT DOCUMENTS

| | | |
|---|---|---|
| JP | 2000-200066 | 7/2000 |
| JP | 2003-122286 | 4/2003 |
| JP | 2007-536708 | 12/2007 |

* cited by examiner (a)

(b)

(a)

(b) <SWITCH OPERATION>

(a)

(b)

<SWITCH OPERATION>

(a)

(b)

(a)

(b)

LIGHT EMITTING MODULE DEVICE, LIGHT EMITTING MODULE USED IN THE DEVICE, AND LIGHTING APPARATUS PROVIDED WITH THE DEVICE

TECHNICAL FIELD

The present invention relates to a light emitting module device that individually controls a plurality of light emitting modules, a light emitting module used in the light emitting module device, and a lighting apparatus provided with the device.

BACKGROUND ART

FIG. 17 shows the configuration of a conventional light emitting module device. In a light emitting module device 100, light emitting modules 101 are arranged in a matrix, the light emitting modules 101 adjacent to each other are connected via connection points 102 for transmitting power, and a terminating apparatus 104 for a power line 103 is attached to the light emitting modules 101 at one end column. Each of the light emitting modules 101 has a control apparatus (not shown) which adjusts the light emission amount of the light emitting module 101 by itself. When the terminating apparatus 104 supplies power to the light emitting modules 101, power is sequentially transmitted to the light emitting modules 101, whereby all the light emitting modules 101 are supplied with power (see, for example, Patent Document 1). In the light emitting module device 100, the control apparatuses can control the light emission amounts of the respective light emitting modules 101. However, since the control apparatus is provided in each of the light emitting modules 101, the production cost increases.

FIG. 18 shows a light emitting module device configured so as to solve the above problems. A light emitting module device 200 includes a control box 202 which collectively controls the light emission amounts of a plurality of light emitting modules 201. Each of the light emitting modules 201 is configured such that the light emission amount thereof is adjusted in accordance with supplied power. Power lines 203 through which power is supplied extend from the control box 202 to the respective light emitting modules 201. The light emitting modules 201 are connected to the control box 202 via the power lines 203 by star topology. The control box 202 controls supply power to each of the light emitting modules 201, thereby controlling the light emission amount of each of the light emitting modules 201 (see, for example, Patent Document 2).

However, in star topology, since dedicated power lines 203 are individually used for connecting the control box 202 to the respective light emitting modules 201, the same number of pairs of lines as the number of the light emitting modules 201 are needed, and thus, the number of the lines is two times as many as the number of the light emitting modules 201. Therefore, the production cost can increase owing to the increase in the number of lines, and thus it has been desired that the production cost is reduced. In addition, it is also desired that the accuracy of signal communication to the light emitting modules 201 is improved.

Besides such light emitting module devices, there is known a plasma display that is capable of individually controlling the light emission amount of each portion of a plasma panel, and that uses a decreased number of power lines. FIG. 19 shows the plasma display. In a plasma display 300, a column power line group 302 and a row power line group 303 are arranged in a grid-like fashion in the plasma panel 301, and a rare gas is enclosed between the column power line group 302 and the row power line group 303. A column driver 304 and a row driver 305 apply a voltage only between a column power line and a row power line that are respectively selected, thereby causing the intersections of the power lines to emit light by discharge (see, for example, Patent Document 3 and Patent Document 4). In the plasma display 300, the column driver 304 and the row driver 305 individually adjust the discharge voltage at each light emitting portion, whereby the light emission amount at each light emitting portion is individually controlled. In addition, each power line is shared by a plurality of light emitting portions of the plasma panel 301, and therefore, the number of power lines that are needed decreased.

Then, it is conceivable to apply the configuration of the plasma display 300 to the light emitting module device, and replace the light emitting portions of the plasma panel 301 with the light emitting modules.

However, in such a light emitting module device, supply power to a plurality of light emitting modules flows in power lines, and as a result, the amount of the supply power flowing in the power lines increases. Therefore, if the supply power is sequentially changed for individually controlling the light emitting modules, increased radiation noise can be superimposed onto the supply power. Since each of the light emitting modules is controlled in accordance with the value of the supply power, the supply power can be regarded as a control signal for controlling the light emitting modules. The radiation noise is superimposed onto the control signal, and therefore, there is a possibility that the light emitting modules cannot be accurately controlled.

Patent Document 1 also discloses a light emitting module as shown in FIGS. 20(a) and 20(b), besides the above-described content. A light emitting module 400 includes: plural pairs of feed terminals 401; a control apparatus 402 which controls the light emission of the light emitting module 400; and plural pairs of communication terminals 403 connected to the control apparatus 402. The appearance of the light emitting module 400 in a plane view is rectangular. A pair of the feed terminals 401 and a pair of the communication terminals 403 are provided at each side of the light emitting module 400. A plurality of the light emitting module 400 are arranged so as to be adjacent to each other, whereby the feed terminals 401 and the communication terminals 403 of each light emitting module 400 are respectively connected to the feed terminals 401 and the communication terminals 403 of the adjacent light emitting module 400. By the connection between the feed terminals 401 of the adjacent light emitting module 400, power is supplied from each light emitting module 400 to the adjacent light emitting module 400. In addition, by the connection between the communication terminals 403 of the adjacent light emitting module 400, communication paths 404 are formed between the adjacent light emitting module 400. A control signal is transmitted or received between a plurality of the light emitting module 400 via the communication paths 404, whereby the plurality of light emitting module 400 operate in cooperation with each other.

However, in the light emitting module 400 described above, the control apparatus 402 of each light emitting module 400 needs to have a function of generating a control signal, and as a result, the cost increases. In addition, since a plurality of the light emitting module 400 are connected on a pair of the communication paths 404, it is necessary to provide IDs (identification codes) for identifying the individual light emitting module 400. As a result, the cost of a lighting apparatus increases because of a complicated providing method of the IDs.

PRIOR ART DOCUMENTS

Patent Documents

Patent Document 1: Published translations of PCT international Publication No. 2007-536708
Patent Document 2: U.S. Pat. No. 7348738
Patent Document 3: Japanese Laid-Open Patent Publication No. S59-24891
Patent Document 4: Japanese Laid-Open Patent Publication No. H04-368991

DISCLOSURE OF THE INVENTION

Problems to be Solved by the Invention

An object of the present invention is to provide: a light emitting module device that is capable of individually controlling a plurality of light emitting modules, and that can reduce the production cost with a decreased number of lines and improve the accuracy of a signal to each light emitting module; and a lighting apparatus including the light emitting module device.

Another object of the present invention is to provide: a light emitting module device that is capable of suppressing radiation noise of communication signals to light emitting modules, and accurately controlling the light emitting modules; a light emitting module used in the light emitting module device; and a lighting apparatus including the light emitting module device.

Means to Solve the Problems

A light emitting module device according to one aspect of the present invention comprises:
 a plurality of light emitting modules;
 a power line through which supply power needed for the plurality of light emitting modules to emit light is supplied to the plurality of light emitting modules; and
 a signal generation unit which generates a control signal for setting the corresponding light emitting module, wherein
 the power line is shared by the plurality of light emitting modules, the power line has switches which turn on or off current conduction to each of the plurality of light emitting modules through open/close operations,
 the signal generation unit generates a signal for controlling the switches such that the switches are individually opened or closed,
 in the open/close control, a light-emission period and an extinction period are provided,
 in the light-emission period, the corresponding switch is closed to cause the corresponding light emitting module to emit light,
 in the extinction period, the corresponding light emitting module is extinguished, and if there is a control signal to be transmitted to the light emitting module, the corresponding switch is opened or closed, whereby the control signal is superimposed onto the supply power, and
 each of the plurality of light emitting modules has a control unit which reads the control signal superimposed onto the supply power and which controls the light emitting module such that the light emitting module is lit up based on the read control signal.

In the light emitting module device configured as described above, a control signal is superimposed onto power supplied via the power line to each of the light emitting modules, and the each light emitting module reads the control signal and lights up in accordance with the read control signal. Thus, the light emitting modules can be individually controlled. In addition, since the power line can be also used as communication lines, the number of lines can be decreased, and therefore, the production cost can be reduced. In addition, since the power line is shared by a plurality of the light emitting modules, the number of lines can be further decreased. Also, since a control signal is superimposed onto supply power in the extinction period in which power supplied to the light emitting module is substantially zero, the light emitting module can easily read the control signal. Therefore, signal communication is ensured, and the accuracy of signal communication can be improved.

A light emitting module device according to another aspect of the present invention comprises:
 a plurality of light emitting modules;
 a signal generation unit which generates a control signal for controlling the corresponding light emitting module; and
 a communication line through which the control signal is transmitted from the signal generation unit to the corresponding light emitting module, wherein
 the plurality of light emitting modules are arranged in an array or in a matrix,
 each of the plurality of light emitting modules has a control unit which receives the control signal from the signal generation unit and which controls the light emitting module such that the light emitting module is lit up based on the received control signal,
 the communication line has column communication lines each of which is shared by the light emitting modules at the corresponding column, and row communication lines each of which is shared by the light emitting modules at the corresponding row,
 the column communication lines and the row communication lines each has a switch which, through open/close operation, causes the corresponding one of the column communication lines and the row communication lines to be in a conductive state/non-conductive state, and
 the signal generation unit controls the open/close operations of the switches, thereby causing the column communication line and the row communication line for the light emitting module that is to be controlled, to be in conductive states, and causing the other column communication lines and the other row communication lines to be in non-conductive states, and transmits the control signal to the light emitting module to be controlled.

In the light emitting module device configured as described above, the switches provided on the communication lines are controlled so as to be opened or closed, and only the light emitting module to be controlled is electrically connected to the signal generation unit. Then, a control signal is transmitted from the signal generation unit to the light emitting module to be controlled. Therefore, the light emitting modules can be individually controlled. In addition, since the communication lines are shared by a plurality of the light emitting modules, the number of lines decreases, and the production cost can be reduced. In addition, since the communication lines are used only for transmitting a control signal, the transmission power that is needed decreases. Therefore, the radiation noise decreases, and the influence of the radiation noise on a control signal can be suppressed. Therefore, the accuracy of control of the light emitting modules increases.

A light emitting module according to one aspect of the present invention comprises:

a planar light emitting device having a light emitting layer sandwiched between the electrodes thereof;

feed terminals which are connected to the electrodes and through which power is supplied to the planar light emitting device;

a rectangular panel to which the planar light emitting device and the feed terminals are provided;

a control unit which receives a control signal, given from the outside, for controlling current conduction to the planar light emitting device, and which controls light emission of the planar light emitting device, based on the control signal; and a plurality of positive terminals for communication and a plurality of negative terminals for communication, through which the control signal for the control unit is received, wherein the plurality of positive terminals are placed at each of two sides of the panel that are opposite to each other, and the plurality of negative terminal placed at each of the other two sides that are opposite to each other, such that, when a plurality of the panels are arranged such that a plurality of the light emitting modules are adjacent to each other, the positive terminals of the respective light emitting modules are connected to each other, and the negative terminals of the respective light emitting modules are connected to each other.

In the light emitting module device configured as described above, when a plurality of the light emitting modules are arranged so as to be adjacent to each other, the positive terminals for communication of the respective light emitting modules are connected to each other, and the negative terminals for communication of the respective light emitting modules are connected to each other, whereby communication paths are formed among a plurality of the light emitting modules. Therefore, a control signal transmitted from the control unit can be transmitted to a plurality of the light emitting modules via the communication paths, and thus, the number of lines through which the control signal is transmitted can be reduced.

DESCRIPTION OF THE PREFERRED EMBODIMENTS

First Embodiment

Figure 1:
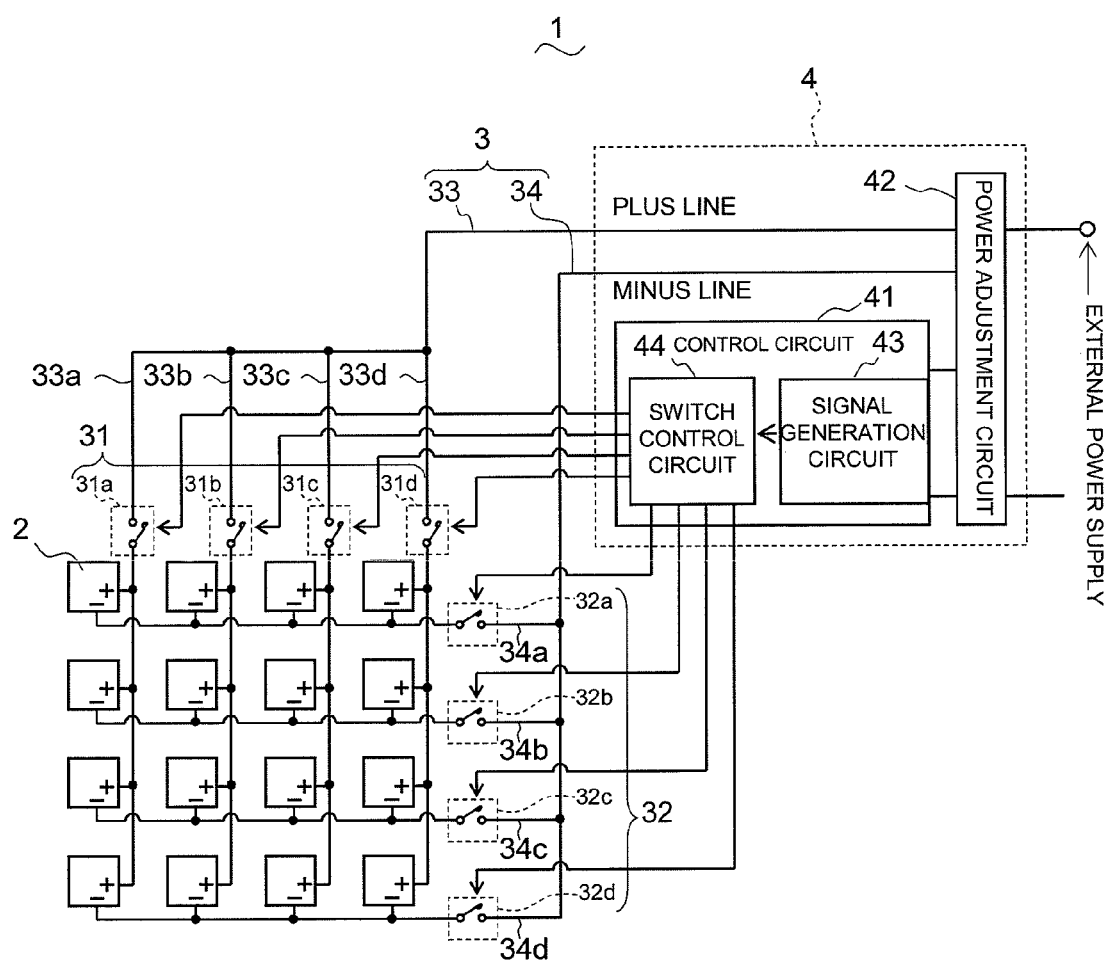
FIG. 1 is a circuit diagram of a light emitting module device according to the first embodiment of the present invention.
Figure 2:
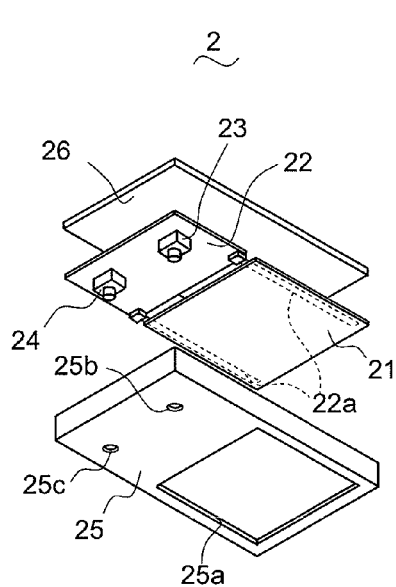
FIG. 2(a) is a perspective exploded view of a light emitting module of the light emitting module device.
FIG. 2(b) shows the circuit configuration of the light emitting module.
Figure 2:
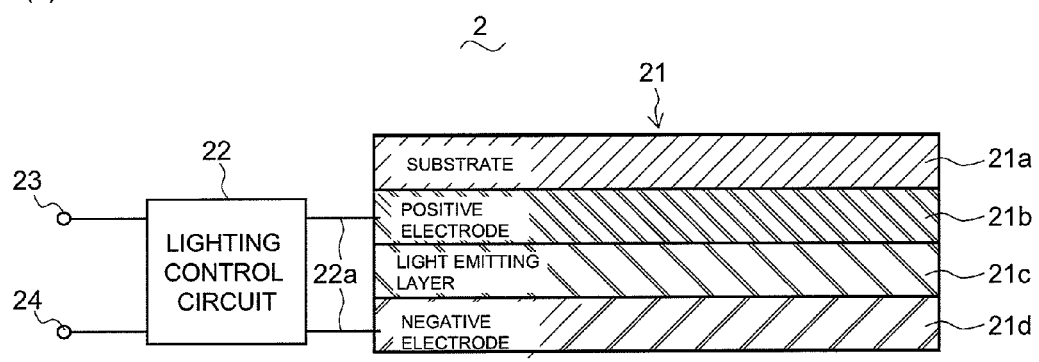
Figure 3:
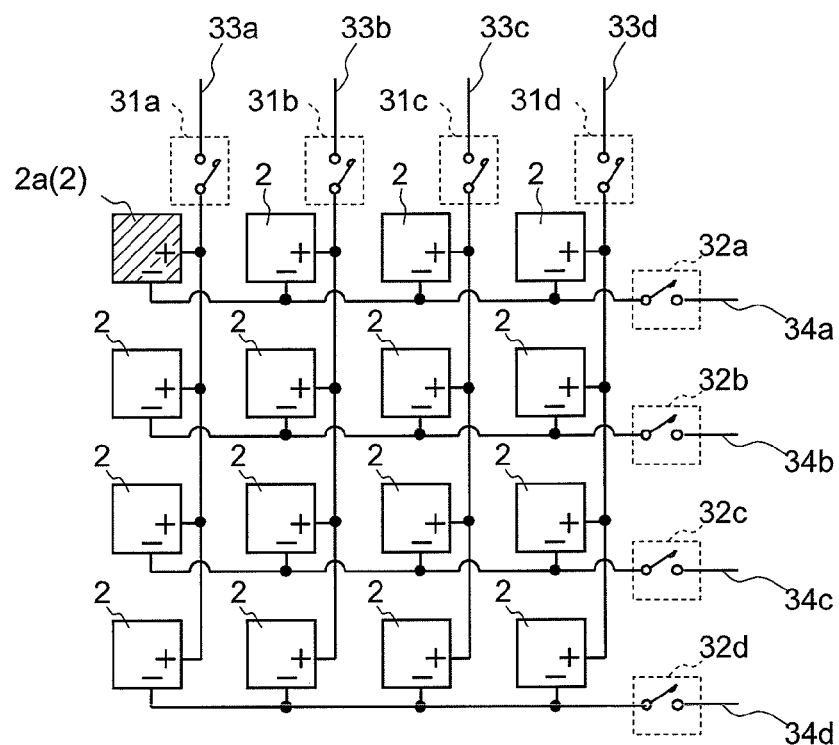
FIG. 3(a) shows the wiring among the light emitting modules, column switches, and row switches of the light emitting module device.
FIG. 3(b) is an operation chart of the column switches and the row switches.
Figure 3:
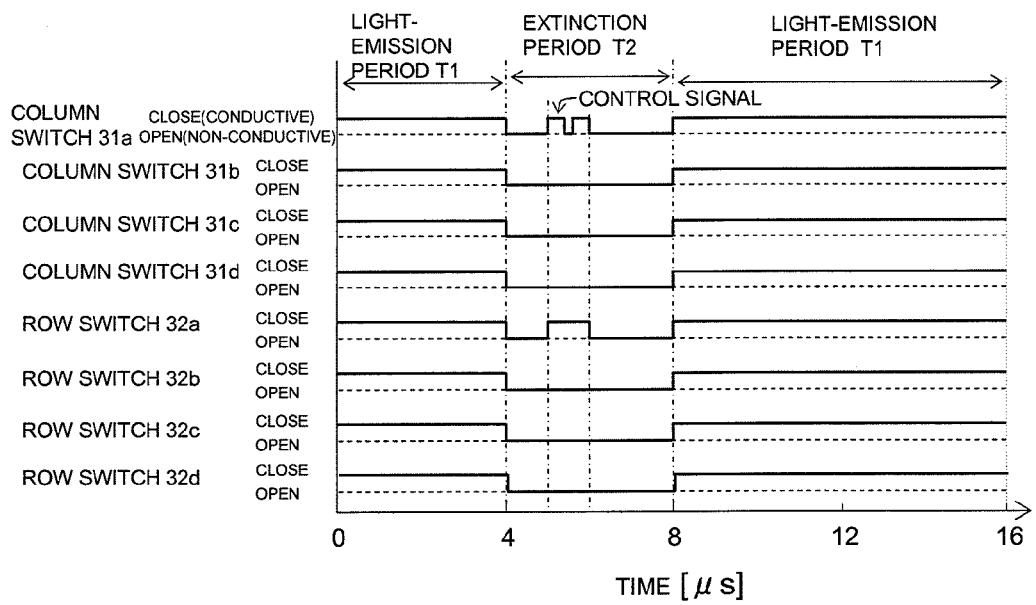

A light emitting module device according to the first embodiment of the present invention will be described with reference to FIGS. 1 to 3. FIG. 1 shows the configuration of the light emitting module device according to the first embodiment. A light emitting module device 1 includes a plurality of light emitting module 2, and a module drive circuit 4 which supplies, via power lines 3, power needed for the light emitting module 2 to emit light, to the light emitting module 2. The light emitting module 2 is arranged in a matrix (in a grid-like fashion) so as to form rows and columns. For example, the light emitting module 2 is arranged in 4-by-4 matrix. The power lines 3 are shared by the plurality of the light emitting module 2. In addition, switches 31 and switches 32 that turn on or off current conduction to each light emitting module 2 through open/close operations are provided on the power lines 3. The module drive circuit 4 performs open/close control for the switches 31 and the switches 32, thereby superimposing a control signal for setting the light emitting module 2, onto supply power.

The power lines 3 are composed of a plus line 33 and a minus line 34. Each of the plus line 33 and the minus line 34 extends from the module drive circuit 4, and branches into a plurality of power lines. The plus line 33 branches into column power lines 33a to 33d each of which is shared by the light emitting module 2 at the corresponding column, and the column power lines 33a to 33d are connected to the plus electrodes of the light emitting module 2 at the respective columns, by bus topology. The minus line 34 branches into row power lines 34a to 34d each of which is shared by the light emitting module 2 at the corresponding row, and the row power lines 34a to 34d are connected to the minus terminals of the light emitting module 2 at the respective rows, by bus topology.

The switches 31 are provided on the respective column power lines 33a to 33d and the switches 32 are provided on the respective row power lines 34a to 34d. The switches 31 and the switches 32 respectively cause the column power lines 33a to 33d and the row power lines 34a to 34d to be in conductive states/non-conductive states, through switching operations, thereby switching the power conditions of the light emitting module 2 at respective columns and the light emitting module 2 at respective rows between power-supplied conditions and power-stopped conditions. The switches 31 and the switches 32 are composed of switching devices such as FETs or IGBTs. Here, the switches 31 which are provided on the column power lines 33a to 33d are referred to as column switches 31a to 31d, respectively, and the switches 32 which are provided on the row power lines 34a to 34d are referred to as row switches 32a to 32d, respectively.

The module drive circuit 4 is composed of a micro controller (control integrated circuit), for example. The module drive circuit 4 includes: a control circuit 41 which performs open/close control for the switches 31 and the switches 32; and a power adjustment circuit 42 which receives power from an external power supply such as a commercial power supply, adjusts the power to an appropriate value, and supplies the adjusted power to the light emitting module 2 and the control circuit 41. The control circuit 41 includes a signal generation circuit 43 which generates an open/close signal for controlling the switches 31 and the switches 32 such that the switches 31 and the switches 32 are individually opened or closed. In addition, the control circuit 41 includes a switch control circuit 44 which controls the open/close operations of the switches 31 and the switches 32, based on the open/close signal generated by the signal generation circuit 43 (signal generation unit). The signal generation circuit 43 generates the control signal described above. In the open/close control for the switches 31 and the switches 32 by the signal generation circuit 43, a light-emission period and an extinction period are provided. In the light-emission period, the corresponding switch 31 and the corresponding switch 32 are closed, and the corresponding light emitting module 2 emits light. In the extinction period, the corresponding light emitting module 2 is extinguished, and if there is a control signal to be transmitted to the light emitting module 2, the switch 31 and the switch 32 are opened or closed, whereby the control signal is superimposed onto supply power.

The control signal is composed of a PWM signal or a digital-data signal, and includes information for specifying the lighting-up/extinction, the dimming ratio, the operation pattern such as fade-in/fade-out operation or blinking speed, or the like of the light emitting module 2. The signal generation circuit 43 controls the switching operations of the switches 31 and the switches 32 by using the switch control circuit 44, thereby controlling supply of power to the power lines 3 and communication via the power lines 3. The power adjustment circuit 42 is composed of a switching power supply circuit, for example. In supplying power, the module drive circuit 4 may, as a current source, supply a current to the light emitting module 2, or may, as a voltage source, apply a voltage to the light emitting module 2.

FIGS. 2(a) and 2(b) show the configuration of each light emitting module 2. The light emitting module 2 includes an organic EL panel 21, and a lighting control circuit 22 (control unit) which controls a supply current to the organic EL panel 21 in accordance with supply power from the power lines 3 (see FIG. 1). In addition, the light emitting module 2 includes: connectors 23 and 24 which are provided on the lighting control circuit 22 and to which the plus line 33 and the minus line 34 of the power lines 3 are connected, respectively; a case 25 which is substantially box-shaped and contains the above components; and a lid body 26 for the case 25. Lines 22a extend from the lighting control circuit 22 to the organic EL panel 21. The lighting control circuit 22 is composed of a micro controller (control integrated circuit), for example, and includes a reading circuit which reads a control signal superimposed onto supply power. The lighting control circuit 22 controls a supply current to the organic EL panel 21, based on the read control signal, thereby controlling the organic EL panel 21 such that the organic EL panel 21 is lit up or dimmed based on the read control signal. The case 25 has: a light radiating window 25a which radiates light emitted from the organic EL panel 21; and holes 25b and 25c through which the connectors 23 and 24 are exposed.

The organic EL panel 21 is formed by laminating, on a substrate 21a, a positive electrode 21b, a light emitting layer 21c, and a negative electrode 21d in this order. The lighting control circuit 22 includes a constant-current circuit which maintains the wave height of a supply current to the organic EL panel 21 at a substantially constant value. In addition, the lighting control circuit 22 includes: a CPU which performs PWM/PFM control for the supply current whose wave height is maintained at a substantially constant value, and controls the light-emission state of the organic EL panel 21; and a substrate on which the constant-current circuit and the CPU are mounted. The constant-current circuit causes the wave height of the supply current to be substantially equal to a current value needed for the organic EL panel 21 to emit light. The constant-current circuit may be composed of a DC-DC converter including a series regulator or a switching regulator, a constant-current diode, or the like. The CPU demodulates a control signal superimposed onto supply power from the power lines 3, and performs PWM/PFM control such that the light-emission state of the organic EL panel 21 becomes a state specified by the control signal.

The CPU of the lighting control circuit 22 may be composed of a semiconductor circuit using a C-MOS. Even if supply of power is stopped, such a semiconductor circuit operates during a predetermined period owing to operation delay based on the time constant of the semiconductor circuit, whereby the setting for the organic EL panel 21 can be maintained during the predetermined period. However, if the predetermined period has passed, the semiconductor circuit stops its operation and the setting for the organic EL panel 21 is reset to be defaulted. In view of this respect, a capacitor which extends the operation period of the CPU after supply of power is stopped is provided in the lighting control circuit 22. It is noted that a memory which stores the setting for the organic EL panel 21 may be provided in the lighting control circuit 22. In this case, even if the CPU has been reset, the CPU reads the setting from the memory, and reflects the setting in the organic EL panel 21.

Next, the open/close control for the column switches 31a to 31d and the row switches 32a to 32d by the signal generation circuit 43 will be described with reference to FIGS. 3(a) and 3(b). Here, it will be assumed that a target to which a control signal is to be transmitted by the open/close control, that is, a target to be controlled is the light emitting module 2 at the first column and the first row in FIG. 3(a) (hereinafter, referred to as a light emitting module 2A).

As shown in FIG. 3(b), in the open/close control for the column switches 31a to 31d and the row switches 32a to 32d, a light-emission period T1 in which power needed for light emission is supplied to the light emitting module 2, and an extinction period T2 in which the light emitting module 2 is extinguished, are provided for all of the light emitting module 2 including the light emitting module 2A. In the extinction period T2, the control signal is superimposed onto supply power. The start timings of the light-emission periods T1 of the light emitting module 2 are substantially equal to each other, and the end timings of the extinction periods T2 of the light emitting module 2 are substantially equal to each other. However, the start timings may be different among the light emitting module 2, and the end timings may be different among the light emitting module 2. The light-emission period T1 and the extinction period T2 are set in advance in the signal generation circuit 43.

In the light-emission period T1, the column switches 31a to 31d and the row switches 32a to 32d for the respective light emitting module 2 are in closed states, whereby power is supplied to the light emitting module 2, and the light emitting module 2 emit light. In the light-emission period T1, a control signal is not superimposed onto supply power.

In the extinction period T2, at the start thereof, the column switches 31a to 31d and the row switches 32a to 32d are opened, whereby supply of power is stopped. Since there is no control signal to be transmitted to the light emitting module 2 other than the light emitting module 2A, the column switches 31b to 31d and the row switches 32b to 32d for the other light emitting module 2 are maintained in opened states, whereby supply of power to the other light emitting module 2 is stopped, and the other light emitting module 2 is extinguished.

Since there is a control signal to be transmitted to the light emitting module 2A, the column switch 31a and the row switch 32a for the light emitting module 2A are opened or closed in accordance with the control signal. In accordance with the open/close operations, power to the light emitting module 2A is supplied and stopped, whereby the control signal is superimposed onto the supply power. When the extinction period T2 is started, the column switch 31a and the row switch 32a are opened to stop supply of power, and thereafter, the column switch 31a and the row switch 32a are closed at substantially the same time. While the control signal is superimposed onto the supply power, one of the column switch 31a and the row switch 32a is maintained in closed states, and the other one performs switching operation in accordance with the control signal. As a result, the supply power is modulated.

Although FIGS. 3(a) and 3(b) has shown an example in which a control signal is transmitted only to the light emitting module 2A, control signals are transmitted also to the other light emitting module 2. The way of the transmission to the other light emitting module 2 is the same as that for the light emitting module 2A. The light-emission period T1 and the extinction period T2 are alternately repeated in a temporally continuous manner. The frequency of the extinction period T2, and the ratio between the light-emission period T1 and the extinction period T2 are set such that a human cannot recognize the change in light output (light emission amount) due to the extinction period T2. It is desirable that the frequency of the extinction period T2 is several hundred hertz or more, for example, substantially 150 [Hz] or more. The frequency of the extinction period T2 is set at 200 [Hz], for example, and the ratio between the extinction period T2 and the light-emission period T1 is set at 1:9, for example. The length of the extinction period T2 is substantially 500 [μs], for example. In this case, it is possible to perform communication by using a PWM signal having a frequency of 10 [kHz] (period of 100 [μs]) as a control signal.

A control signal is transmitted in every extinction period T2, and a control signal is transmitted to one light emitting module per one extinction period T2. In addition, control signals are sequentially transmitted in the arrangement order of the light emitting module 2. For example, control signals are sequentially transmitted to the light emitting module 2 at each row in the order from the one at the first column to the one at the fourth column, the transmission being started from the first row down to the fourth row. The way of the transmission of control signals is not limited to the above way. Control signals may be transmitted to a plurality of the light emitting module 2 per one extinction period T2. Instead of transmitting a control signal every extinction period T2, a control signal may be transmitted as necessary. Instead of transmitting control signals in the arrangement order of the light emitting module 2, control signals may be transmitted in a random manner. Control signals may be transmitted to a plurality of the light emitting module 2 at the same column or at the same row, at substantially the same time.

Each of the lighting control circuits 22 of the light emitting module 2 including the light emitting module 2A detects the start of the extinction period T2, based on the stop of supply of power after the light-emission period T1 is ended. Then, the lighting control circuit 22 detects, as a control signal, the restart and the stop of supply of power occurring in the extinction period T2, thereby determining that the corresponding light emitting module 2 is to be controlled. The lighting control circuit 22 reflects the content of the control signal in processing, in the next light-emission period T1 or later. The electrostatic capacitance of the capacitor of each lighting control circuit 22 is set such that the operation period of the lighting control circuit 22 after supply of power is stopped is longer than the extinction period T2, whereby the setting for the organic EL panel 21 is prevented from being defaulted in the extinction period T2.

In the light emitting module device 1 of the present embodiment configured as described above, a control signal is superimposed onto power supplied via the power lines 3 to each light emitting module 2, and the light emitting module 2 reads the control signal and lights up in accordance with the read control signal. Thus, the light emitting module 2 can be individually controlled. In addition, since the power lines 3 can be also used as communication lines through which a control signal is transmitted, the number of lines can be decreased, and therefore, the production cost can be reduced.

In addition, since the power lines 3 are shared by a plurality of the light emitting module 2, the number of lines can be further decreased. Also, since a control signal is superimposed onto supply power in the extinction period T2 in which power supplied to the light emitting module 2 is substantially zero, the light emitting module 2 can easily read the control signal. This contributes to ensuring signal communication.

In addition, the number of the power lines that are needed is only the sum of the number of the columns and the number of the rows of the light emitting module 2. Therefore, the number of the power lines 3 can be decreased in comparison with, for example, the conventional case where power lines are connected to light emitting modules by star topology, whereby the number of the power lines is two times as many as the number of the light emitting modules. Therefore, the production cost can be reduced. In addition, since the number of the power lines 3 that are needed decreases, the degree of freedom of wiring increases.

In addition, it is not necessary to provide the light emitting module 2 with IDs for identifying the individual light emitting modules, and the light emitting module 2 does not need to have memories which store the IDs. Therefore, the production cost can be reduced.

Figure 4:
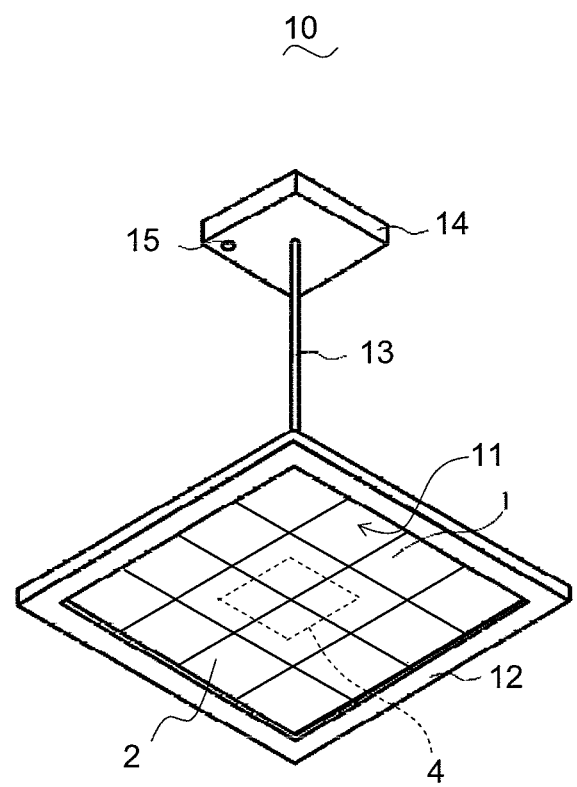
FIG. 4 shows a perspective view of a lighting apparatus including the light emitting module device.

Next, a lighting apparatus including the light emitting module device 1 of the present embodiment will be described with reference to FIG. 4. FIG. 4 shows the configuration of the lighting apparatus. A lighting apparatus 10 is configured as a pendant light, for example, and is installed on the ceiling. The lighting apparatus 10 includes a light emitting unit 11 that includes a plurality of the light emitting module 2. The light emitting unit 11, the power lines 3, and the module drive circuit 4 are contained in a lighting apparatus case 12 having a light radiating window. The lighting apparatus case 12 is suspended from a suspending unit 14 by a power supply cord 13 through which power is supplied from a commercial power supply to the module drive circuit 4. The suspending unit 14 is attached to the ceiling surface. The suspending unit 14 has a remote controller light receiving unit 15 on the surface thereof. The remote controller light receiving unit 15 receives a remote controller signal transmitted from a remote controller (not shown), and inputs the remote controller signal to the module drive circuit 4 via a communication line. The control circuit 41 of the module drive circuit 4 controls the light emitting module 2 such that the light emitting module 2 is, for example, lit up, extinguished, or dimmed, in accordance with the inputted remote controller signal.

In the lighting apparatus 10 configured as described above, since light emission control can be individually performed for a plurality of the light emitting module 2, variation in luminance among the light emitting module 2 can be suppressed.

It is noted that the lighting apparatus 10 is not limited to a pendant light. For example, the lighting apparatus 10 may be configured as a base light, a ceiling light, a bracket light, or the like. In addition, the light emitting module devices according to the later-described variations of the present embodiment are applicable to the lighting apparatus 10. The lighting apparatus 10 to which the light emitting module devices of the variations are applied also provides the same effect as described above.

First Variation of First Embodiment

A light emitting module device according to the first variation of the first embodiment will be described. Since the configuration of the light emitting module device is the same as that of the first embodiment, FIG. 1 is also used in the description below. The present variation is different from the first embodiment in the way of communication control for the light emitting module 2 by the signal generation circuit 43.

Figure 5:
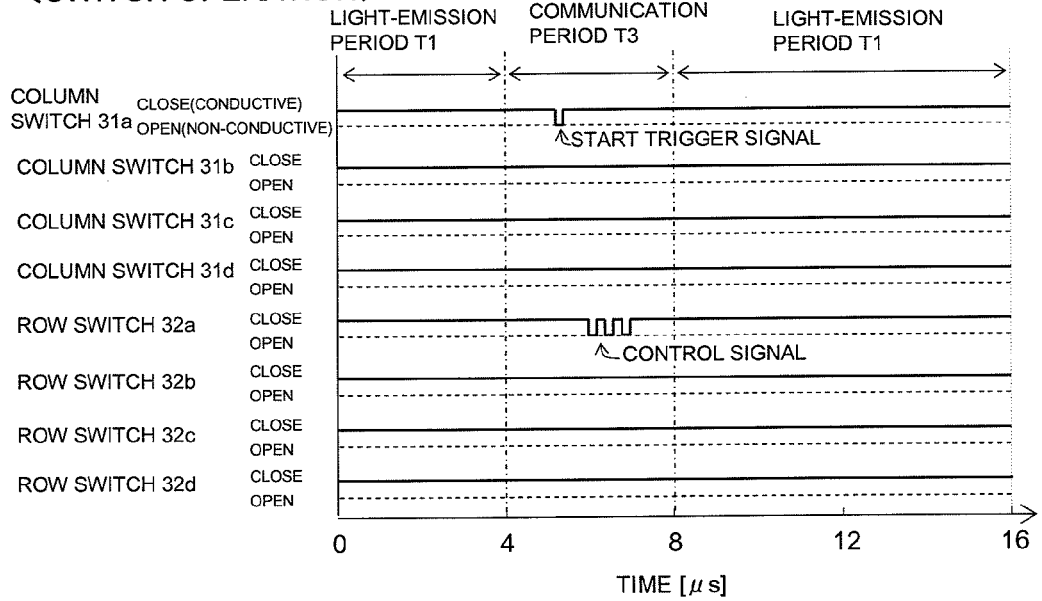
FIG. 5 is an operation chart of column switches and row switches of a light emitting module device according to the first variation of the first embodiment.

FIG. 5 shows switching operations of the column switches 31a to 31d and the row switches 32a to 32d for which open/close control is performed by the signal generation circuit 43 of the present variation. In FIG. 5, a control signal is to be transmitted only to the light emitting module 2A (see FIG. 3(a)). In the open/close control, a communication period T3 is provided in place of the extinction period T2 of the first embodiment. In the communication period T3, the corresponding light emitting module 2 emits light, and if there is a control signal to be transmitted to the light emitting module 2, the control signal is superimposed onto supply power. In this period, basically, power is supplied to the light emitting module 2, and if there is a control signal to be transmitted, the control signal is superimposed onto supply power.

In the communication period T3, since there is no control signal to be transmitted to the light emitting module 2 other than the light emitting module 2A, the column switches 31b to 31d and the row switches 32b to 32d for the other light emitting module 2 are maintained in closed states, whereby supply of power is continued and the other light emitting module 2 continues to emit light.

One of the column switch 31a and the row switch 32a for the light emitting module 2A changes from a closed state to an opened state, whereby supply of power is stopped during a predetermined period, and thereafter, the one of the column switch 31a and the row switch 32a returns to a closed state. The change in the supply power at this time serves as a start trigger signal for communication. Thereafter, the other one is opened or closed in accordance with a control signal in the communication period 3. In accordance with the open/close operations, supply of power to the light emitting module 2A is stopped and restarted, whereby the control signal is superimposed onto the supply power.

If supply of power is stopped and then restarted after a predetermined period has passed, each of the lighting control circuits 22 of the light emitting module 2 including the light emitting module 2A determines that the start trigger signal has been received. Then, after the start trigger signal is received, if the lighting control circuit 22 has detected stop and restart of supply of power in the communication period T3, the lighting control circuit 22 determines the stop and the restart as a control signal, and if the lighting control circuit 22 has not detected stop and restart, the lighting control circuit 22 deletes the received start trigger signal. The period in which supply of power is stopped owing to the start trigger signal is set to be shorter than the operation period of the lighting control circuit 22 after supply of power is stopped.

In the present variation, the period in which the light emitting module 2 is extinguished can be decreased in comparison with the first embodiment, whereby the light emission amount can be prevented from being decreased owing to communication.

Second Variation of First Embodiment

A light emitting module device according to the second variation of the first embodiment will be described. Since the configuration of the light emitting module device is the same as that of the first embodiment, FIGS. 1 and 2 are also used in the description below. In the present variation, the lighting control circuit 22 of the light emitting module 2 does not have a capacitor which extends the operation period after supply of power is stopped. If supply of power is stopped during a predetermined period or longer, the setting is reset.

Figure 6:
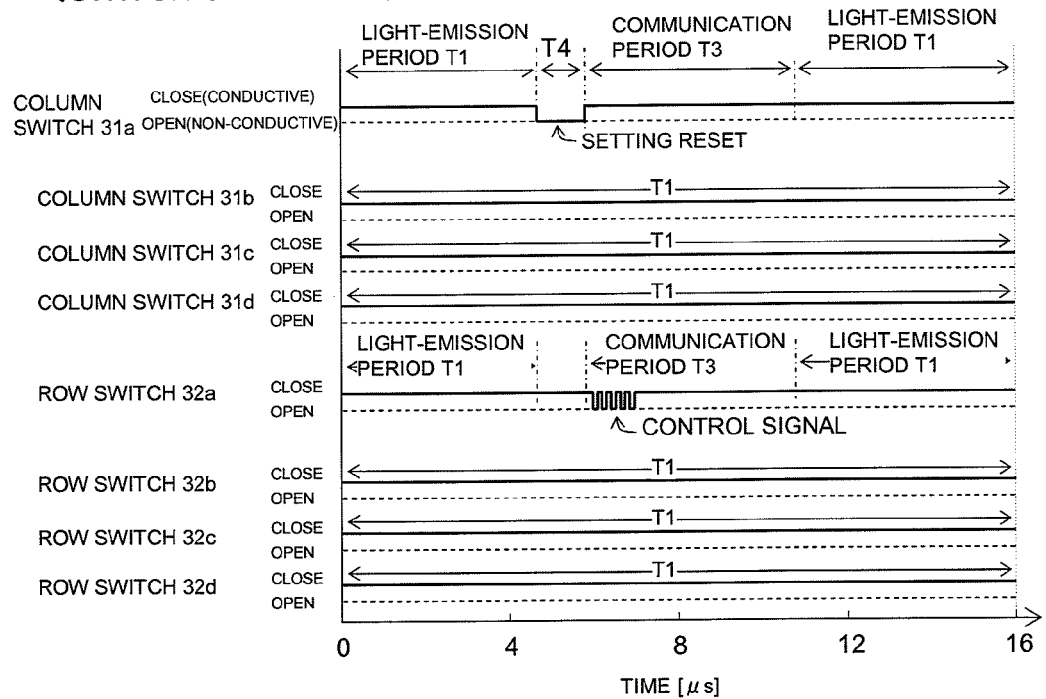
FIG. 6 is an operation chart of column switches and row switches of a light emitting module device according to the second variation of the first embodiment.

FIG. 6 shows switching operations of the column switches 31a to 31d and the row switches 32a to 32d for which open/close control is performed by the signal generation circuit 43 of the present variation. In FIG. 6, a control signal is to be transmitted only to the light emitting module 2A (see FIG. 3(a)).

One of the column switch 31a and the row switch 32a for the light emitting module 2A changes from a closed state to an opened state, and continues to be in an opened state during a predetermined period T4, during which supply of power is stopped. Thereafter, the one of the column switch 31a and the row switch 32a returns to a closed state, whereby supply of power is restarted. The predetermined period T4 is set to be longer than the operation period of the lighting control circuit 22 after supply of power is stopped. Therefore, after the predetermined period T4 has passed, the setting of the lighting control circuit 22 for the organic EL panel 21 is reset. The communication period T3 is a predetermined period after the setting of the lighting control circuit 22 is reset and supply of power is restarted.

After the setting is reset, if each of the lighting control circuits 22 of the light emitting module 2 including the light emitting module 2A has detected stop and restart of supply of power in the communication period T3, the lighting control circuit 22 determines the stop and the restart as a control signal, and operates based on the control signal. If the lighting control circuit 22 has not detected a control signal in the communication period T3, the lighting control circuit 22 performs a predetermined operation, or operates the organic EL panel 21 in accordance with the setting as it was before the reset, which is stored in the memory.

In the present variation, reset of the setting of the lighting control circuit 22 of the light emitting module 2 can be determined as a start trigger for communication, and it is not necessary to detect change in supply of power to the light emitting module 2 in order to detect the start trigger. Therefore, it is not necessary to provide a circuit for the detection. As a result, the configuration is simplified. In addition, since the setting of the light emitting module 2 can be reconfigured after the setting is reset, it can be ensured that the setting is successfully done.

Second Embodiment

Figure 7:
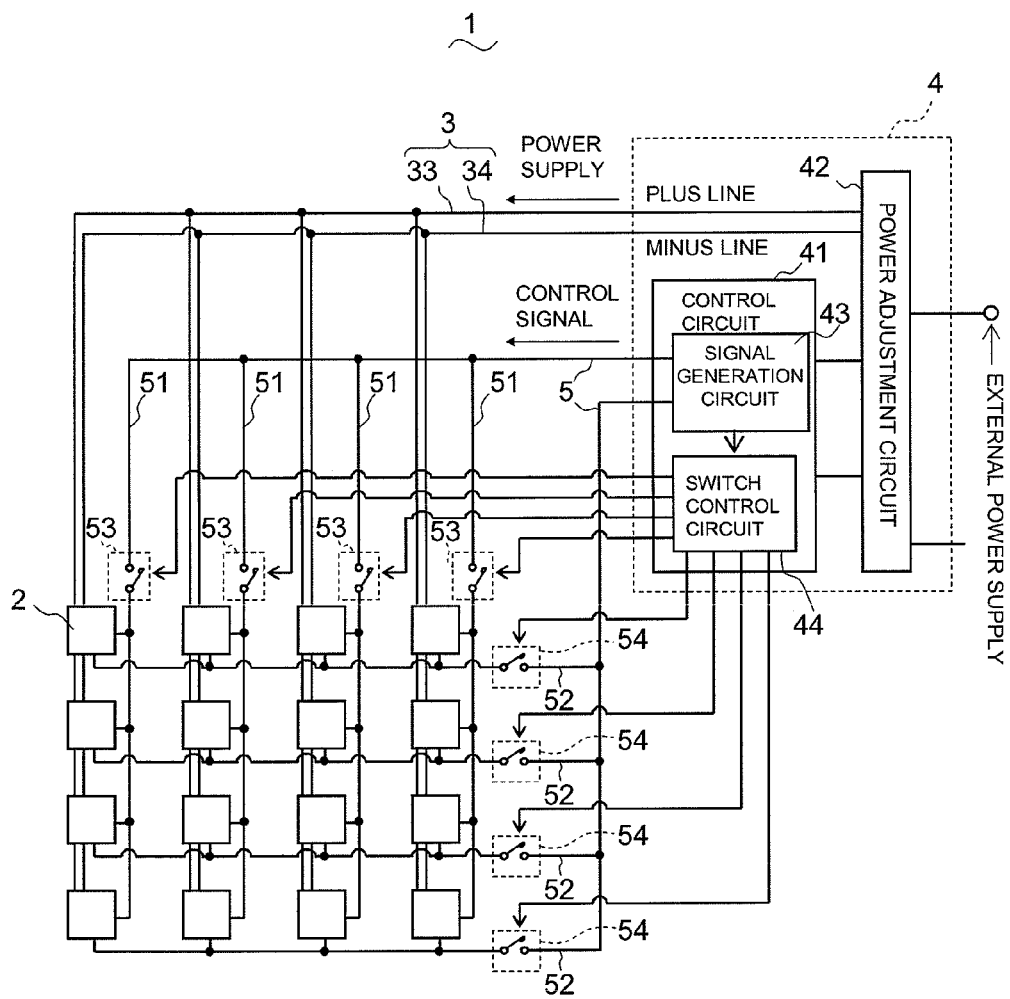
FIG. 7 is a circuit diagram of a light emitting module device according to the second embodiment of the present invention.
Figure 8:
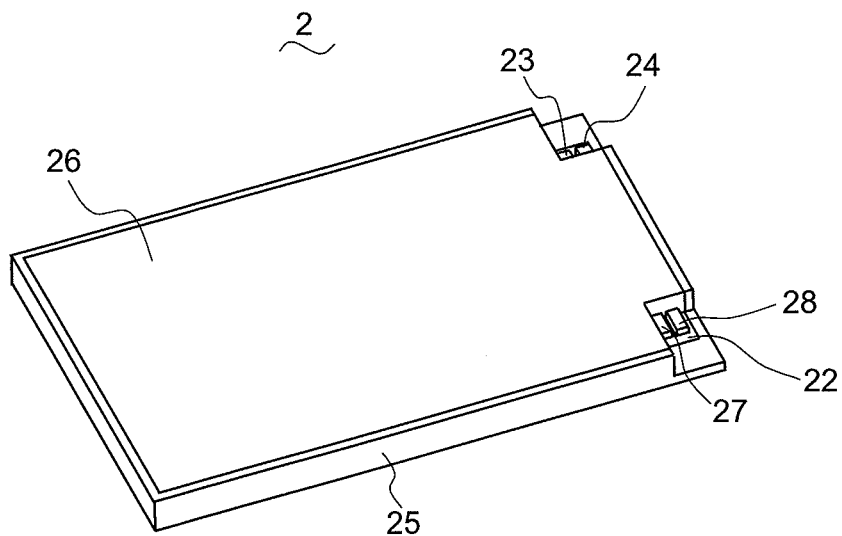
FIG. 8(a) is a perspective view of a light emitting module of the light emitting module device.
FIG. 8(b) is a perspective exploded view of the light emitting module.
Figure 8:
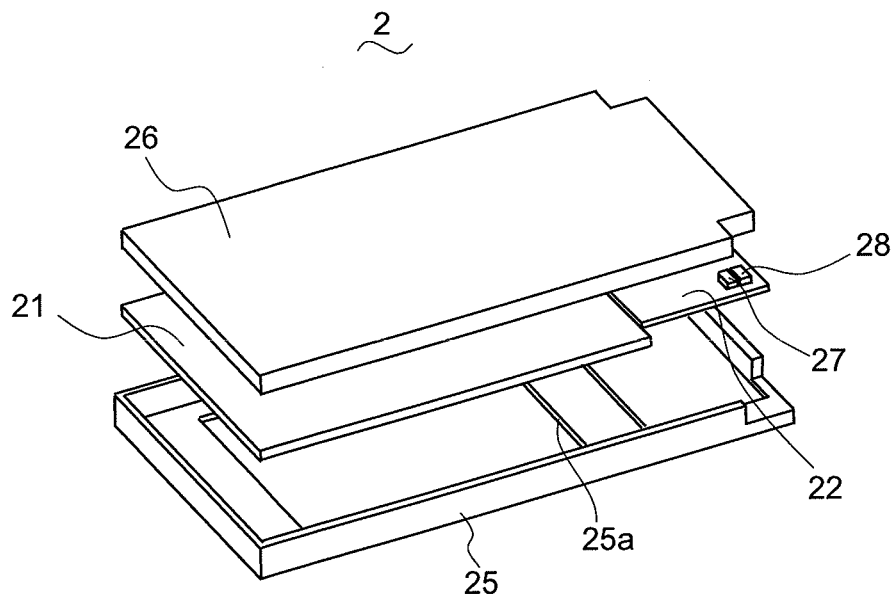

A light emitting module device according to the second embodiment of the present invention will be described with reference to FIGS. 7 to 13. FIG. 7 shows the configuration of the light emitting module device of the present embodiment. The light emitting module device 1 of the present embodiment is different from that of the first embodiment in that the light emitting module device 1 of the present embodiment further includes communication lines 5 through which a control signal transmitted from the module drive circuit 4 is transmitted to the light emitting module 2. The communication lines 5 are composed of: column communication lines 51 each of which is shared by the light emitting module 2 at the corresponding column; and row communication lines 52 each of which is shared by the light emitting module 2 at the corresponding row. Each of the column communication lines 51 connects the light emitting module 2 at the corresponding column to the control circuit 41, and each of the row communication lines 52 connects the light emitting module 2 at the corresponding row to the control circuit 41. The column communication lines 51 and the row communication lines 52 have column switches 53 and row switches 54 (hereinafter, referred to as switches 53 and switches 54), respectively. The switches 53 and the switches 54 respectively cause the column communication lines 51 and the row communication lines 52 to be in conductive states/non-conductive states through open/close operations.

The control circuit 41 individually performs open/close control for the switches 53 and the switches 54, thereby transmitting a control signal to the light emitting module 2 to be controlled. The signal generation circuit 43 generates a control signal for the light emitting module 2, and an open/close signal for controlling the switches 53 and the switches 54 such that the switches 53 and the switches 54 are opened or closed. The switch control circuit 44 controls the switches 53 and the switches 54 such that the switches 53 and the switches 54 are opened or closed based on the open/close signal generated by the signal generation circuit 43, that is, the states of the switches 53 and the switches 54 are switched between conductive states and non-conductive states, based on the open/close signal. The signal generation circuit 43 selects the light emitting module 2 to be controlled. The signal generation circuit 43 individually controls the switches 53 and the switches 54 by using the switch control circuit 44, thereby causing the column communication line 51 and the row communication line 52 for the selected light emitting module 2 that is to be controlled, to be in conductive states, and causing the other column communication lines 51 and the other row communication lines 52 to be in non-conductive states. As a result, only the light emitting module 2 to be controlled is electrically connected to the signal generation circuit 43. In this state, the signal generation circuit 43 transmits a control signal for the light emitting module 2 to be controlled. As a result, the transmitted control signal arrives only at the light emitting module 2 to be controlled.

The control signal includes information for specifying the lighting-up/extinction, the dimming ratio, the operation pattern such as fade-in/fade-out operation or blinking speed, or the like of the light emitting module 2. In supplying power, the power adjustment circuit 42 may, as a current source, supply a current to the light emitting module 2, or may, as a voltage source, apply a voltage to the light emitting module 2.

The column communication lines 51 and the row communication lines 52 are wired in a grid-like fashion so as to intersect with each other. One of the communication lines 5, which are composed of a pair of lines, branches into the column communication lines 51, and the other one branches into the row communication lines 52. Each of the number of the column communication lines 51 and the number of the row communication lines 52 is four, that is, the sum of them is eight, which corresponds to ¼ of sixteen pairs of lines (thirty-two lines) used in the case of star topology. By the control circuit 41 switching the states of the switches 53 and the switches 54 between conductive states and non-conductive states, the switches 53 and the switches 54 respectively cause the column communication lines 51 and the row communication lines 52 to be in conductive states/non-conductive states with respect to the module drive circuit 4. The switches 53 and the switches 54 are composed of semiconductor switches, e.g., switching devices such as FETs or IGBTs.

The plus line 33 and the minus line 34 are shared by the light emitting module 2 at each column and are connected to the light emitting module 2 at each column by bus topology, so that power can be supplied to a plurality of the light emitting module 2 by using a minimized number of lines. The plus line 33 and the minus line 34 are provided separately from the communication lines 5.

FIGS. 8(a) and 8(b) show the configuration of the light emitting module 2 of the present embodiment. The lighting control circuit 22 of the light emitting module 2 further includes communication line connectors 27 and 28 to which the column communication line 51 and the row communication line 52 are connected, respectively. The communication line connectors 27 and 28 are exposed out of the case 26.

Figure 9:
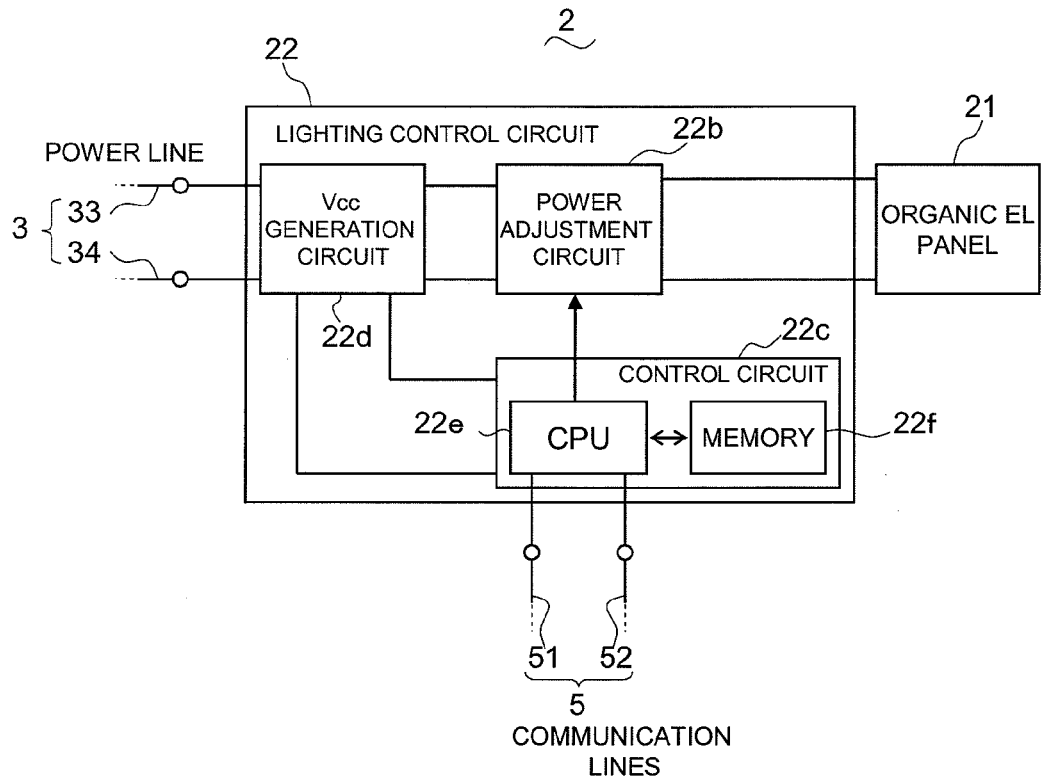
FIG. 9 is a block diagram showing the electrical configuration of the light emitting module.

FIG. 9 shows the electrical configuration of the light emitting module 2. The lighting control circuit 22 operates based on supply power from the power lines 3, and performs lighting control for the organic EL panel 21, based on a control signal from the communication lines 5. The lighting control circuit 22 includes a power adjustment circuit 22b, a control circuit 22c, and a Vcc generation circuit 22d. The power adjustment circuit 22b adjusts supply power to the organic EL panel 21. The control circuit 22c controls power adjustment operation of the power adjustment circuit 22b, based on a control signal from the communication lines 5, thereby controlling the light emission state of the organic EL panel 21. The Vcc generation circuit 22d generates a drive voltage Vcc, based on supply power from the power lines 3, and applies the drive voltage Vcc to the control circuit 22c. The Vcc generation circuit 22d applies a drive voltage also to the power adjustment circuit 22b.

The control circuit 22c includes a CPU 22e and a memory circuit 22f (composing a memory unit). The CPU 22e receives a control signal transmitted from the signal generation circuit 43, via the communication lines 5, and stores the received control signal in the memory circuit 22f. The memory circuit 22f is composed of a nonvolatile memory such as a flash memory, a ferroelectric memory, or a magnetic random access memory. The memory circuit 22f retains the control signal stored therein by the CPU 22e, at least until the CPU 22e receives the next control signal and stores the next control signal in the memory circuit 22f. The memory circuit 22f may be built in the control circuit 22c, or may be provided as an external memory.

The CPU 22e reads the control signal stored in the memory circuit 22f. Based on information included in the control signal, the CPU 22e generates an instruction signal for instructing the power adjustment circuit 22b to adjust power, and transmits the instruction signal to the power adjustment circuit 22b. The instruction signal is a PWM signal, for example. The reading of the control signal and the transmission of the instruction signal by the CPU 22e are repeated until the CPU 22e receives the next control signal via the communication lines 5.

The power adjustment circuit 22b adjusts an applied voltage or a supply current to the organic EL panel 21, based on the instruction signal transmitted from the CPU 22e, thereby causing the organic EL panel 21 to be in the state specified by the control signal. The adjustment of the applied voltage or the supply current is performed by PWM control for the applied voltage or the supply current, for example.

Figure 10:
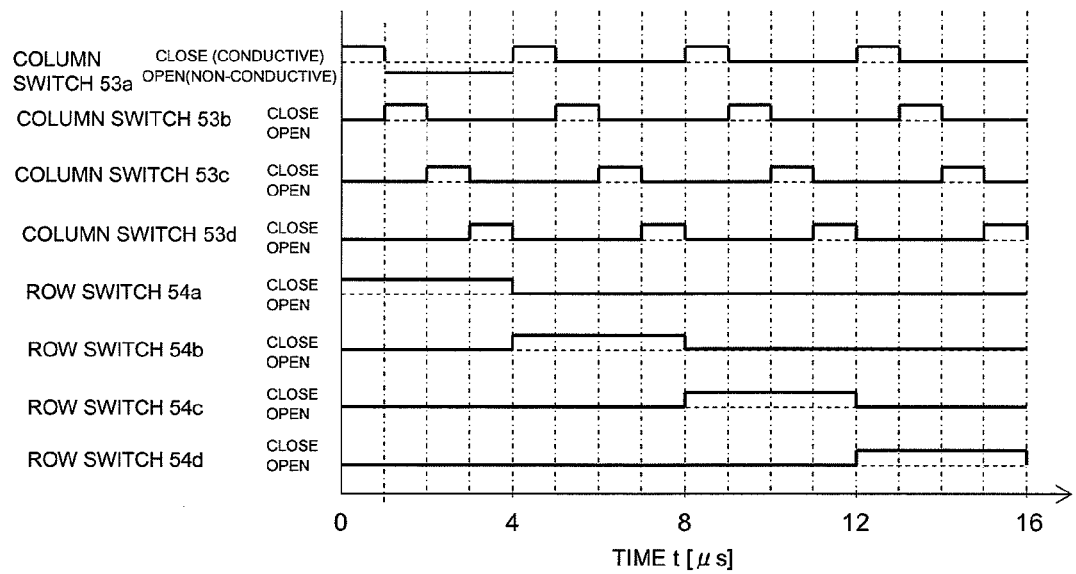
FIG. 10 is an operation chart of column switches and row switches of the light emitting apparatus.

FIG. 10 shows the operations of the switches 53 and 54 for which open/close control is performed by the signal generation circuit 43, and FIGS. 11(a) to 11(e) show the light emitting module 2 to be controlled by the signal generation circuit 43, in chronological order. Here, the column communication lines 51 for the first to fourth columns of the light emitting module 2 are referred to as column communication lines 51a to 51d, respectively, and the row communication lines 52 for the first to fourth columns are referred to as row communication lines 52a to 52d, respectively. In addition, the column switches 53 provided on the column communication lines 51a to 51d are referred to as column switches 53a to 53d, respectively, and the row switches 54 provided on the row communication lines 52a to 52d are referred to as row switches 54a to 54d, respectively. In FIG. 10, closed-states and opened-states of the column switches 53a to 53d and the row switches 54a to 54d correspond to conductive states and non-conductive states, respectively. In addition, in FIG. 11, a target to be controlled, that is, the light emitting module 2 to be selected as a transmission destination of a control signal is shaded.

The signal generation circuit 43 temporally changes each of the opened/closed states of the column switches 53a to 53d and the row switches 54a to 54d, thereby sequentially causing the light emitting module 2 to be electrically connected to the signal generation circuit 43, in chronological order. The signal generation circuit 43 transmits a control signal to the light emitting module 2 electrically connected to the signal generation circuit 43.

Here, it will be assumed that a target to which a control signal is to be transmitted, that is, a target to be controlled changes in the arrangement order of the light emitting module 2. For example, it will be assumed that control signals are transmitted to the light emitting module 2 at each row in the order from the one at the first column to the one at the fourth column, the transmission being started from the first row down to the fourth row. In this case, first, the light emitting module 2A at the first row and the first column is selected as the first target to be controlled (see FIG. 11(a)), and the column switch 53a and the row switch 54a are closed. As a result, the light emitting module 2A is electrically connected to the signal generation circuit 43. At this time, the column switches 53b to 53d and the row switches 54b to 54d are opened, and the light emitting module 2 other than the target to be controlled are electrically disconnected from the signal generation circuit 43. Then, a control signal is transmitted to the light emitting module 2A. The electrically-connected period of each light emitting module 2 is set in advance, for example, at substantially 1 [μs].

Figure 11:
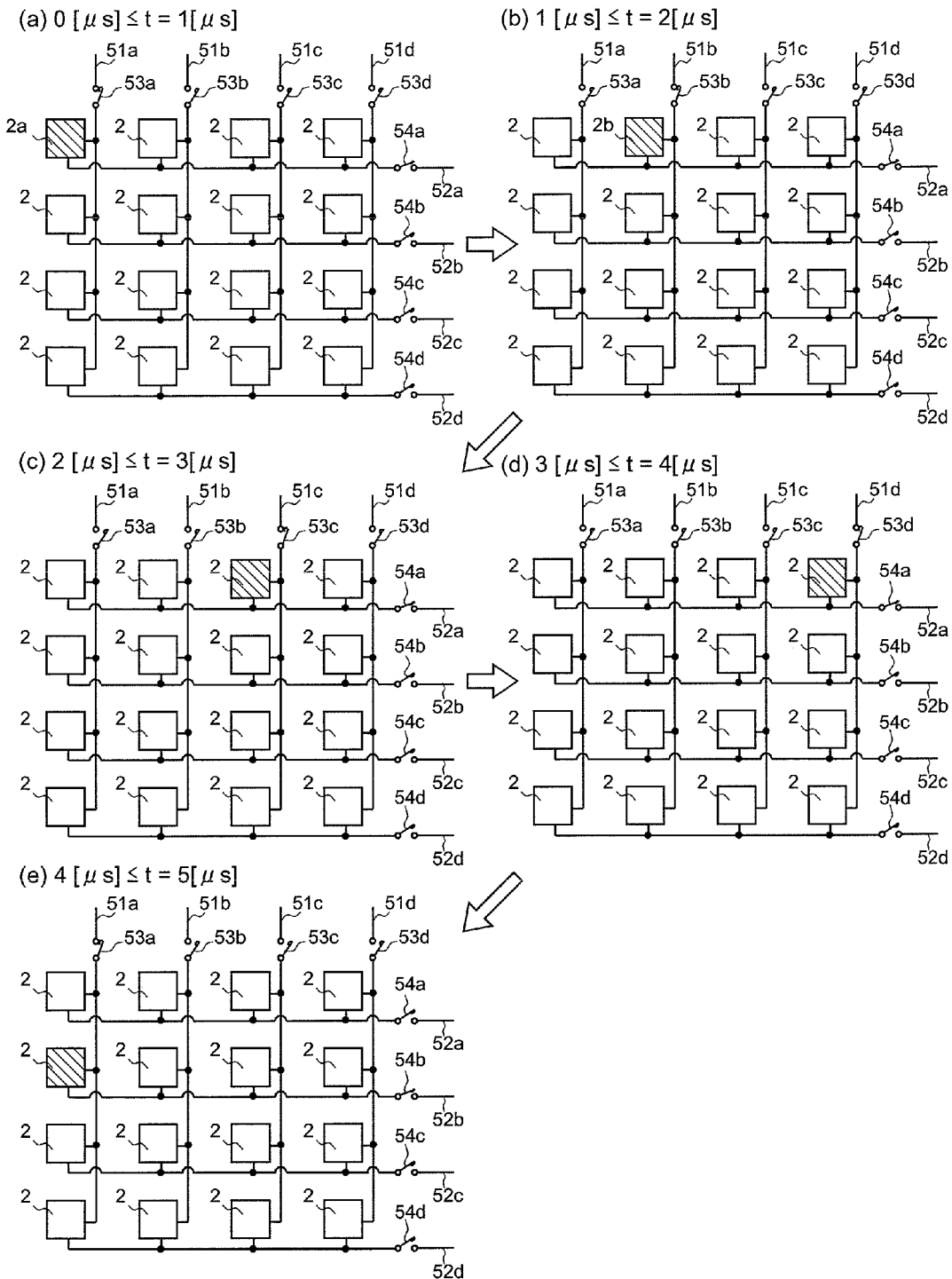
FIGS. 11(a) to (e) show how to sequentially select the light emitting module as a target to be controlled, in chronological order.

If the electrically-connected period of the light emitting module 2A has passed, a light emitting module 2B at the first row and the second column is selected as a target to be controlled (see FIG. 11 (b)), and the column switch 53b is closed while the row switch 54a is maintained in a closed state. The column switches 53a, 53c, and 53d, and the row switches 54b to 54d are in opened states. As a result, only the light emitting module 2B is electrically connected, and a control signal is transmitted to the light emitting module 2B. Thereafter, control signals are sequentially transmitted also to the other light emitting module 2, in the same manner as in the light emitting modules 2A and 2B (FIGS. 11(c) to 11(e)).

As described above, the column switches 53a to 53d and the row switches 54a to 54d are controlled such that one of the column switches 53a to 53d and one of the row switches 54a to 54d are caused to be in conductive states at the same time, whereby the corresponding one of the column communication lines 51a to 51d and the corresponding one of the row communication lines 52a to 52d are caused to be in conductive states at the same time. As a result, one of the light emitting module 2 is selected by the column communication line 51 and the row communication line 52 that are in conductive states. In addition, the states of the column communication lines 51 and the row communication lines 52 temporally change while switching between conductive states and non-conductive states, whereby the light emitting module 2 is sequentially selected one by one.

Figure 12:
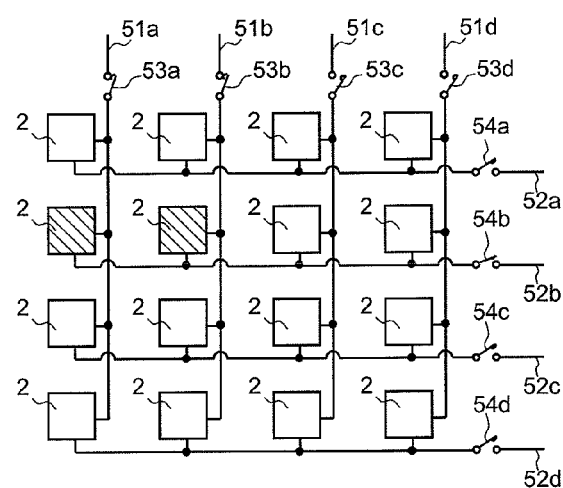
FIG. 12 shows the case where a plurality of the light emitting modules of the light emitting module device are selected as targets to be controlled.
Figure 13:
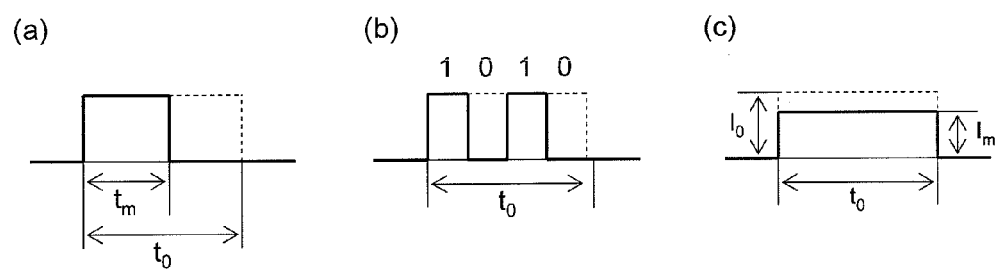
FIG. 13(a) shows the waveform of a control signal to the light emitting module of the light emitting module device.
FIG. 13(b) shows another waveform of the control signal.
FIG. 13(c) shows still another waveform of the control signal.

As shown in FIG. 12, a plurality of the light emitting module 2 may be selected as targets to be controlled, at the same time. In this case, one switch included in a group of the column switches 53a to 53d or a group of the row switches 54a to 54d is closed, and a plurality of switches included in the other group are closed, whereby a plurality of the light emitting module 2 are electrically connected. Alternatively, a plurality of switches included in each group are closed, whereby a plurality of the light emitting module 2 are electrically connected. Then, the same control signal is transmitted to the plurality of light emitting module 2 at the same time. Such control is performed in the case where, for example, all the light emitting module 2, or the light emitting module 2 at each column or at each row are lit up, dimmed, extinguished, or blinked at the same time.

FIG. 13(a) shows the waveform of a control signal transmitted from the signal generation circuit 43 to the light emitting module 2. The control signal is composed of a PWM signal. In the control signal, a period tm in which the control signal is ON is set to be within a predetermined period t0 that is the maximum width of one pulse. As a result, the control signal gives an instruction such that, for example, the dimming ratio becomes (t0−tm)/t0 or tm/t0.

The control signal may be composed of a digital signal obtained by temporally dividing the predetermined period t0 and associating ON and OFF in each divided period with 1 and 0, respectively, as shown in FIG. 13(b). The control signal shown in FIG. 13(b) can transmit 4-bit information. In the case of dimming signal, sixteen levels of dimming signals can be transmitted. The control signal may be composed of an analog signal obtained by modulating the amplitude of a signal in accordance with control information, as shown in FIG. 13(c). In the control signal shown in FIG. 13(c), an amplitude Im that is equal to or smaller than the maximum amplitude I0 is set. As a result, the control signal gives an instruction such that, for example, the dimming ratio becomes (I0−Im)/I0 or Im/I0. The control signal may be composed of a PCM (pulse code modulation) signal.

In the light emitting module device 1 of the present embodiment configured as described above, the switches 53 and the switches 54 provided on the communication lines 5 are controlled so as to be opened or closed, and only the light emitting module 2 to be controlled is electrically connected to the signal generation circuit 43. Then, a control signal is transmitted from the signal generation circuit 43 to the light emitting module 2 to be controlled. Therefore, the light emitting module 2 can be individually controlled. In addition, since each of the states of the column switches 53a to 53d and the row switches 54a to 54d (the switches 53 and the switches 54) is sequentially switched between an opened state and a closed state, a plurality of the light emitting module 2 can be controlled in a time-sharing manner.

In addition, since the communication lines 5 are shared by a plurality of the light emitting module 2, the number of the communication lines 5 that are needed is only the sum of the number of the columns and the number of the rows of the light emitting module 2. Therefore, the number of the communication lines 5 can be decreased in comparison with, for example, the case where the communication lines are connected to the light emitting modules by star topology, whereby the number of the communication lines is two time as many as the number of the light emitting modules. Therefore, the production cost can be reduced. In addition, since the number of the communication lines 5 that are needed decreases, the degree of freedom of wiring increases.

In addition, since the communication lines 5 are used only for transmitting a control signal, the transmission power that is needed decreases. Therefore, the radiation noise decreases, and the influence of the radiation noise on a control signal can be suppressed. Therefore, the accuracy of control of the light emitting module 2 increases.

In addition, it is not necessary to provide the light emitting module 2 with IDs for identifying the individual light emitting modules, and the light emitting module 2 do not need to have memories or the like which store the IDs. Therefore, the production cost can be reduced.

In addition, since the memory circuit 22f retains the current control signal until the next control signal is received, the light emitting module 2 can be controlled based on the current control signal until the next control signal is received. Therefore, it is possible to perform control in a temporally continuous manner. In addition, since the memory circuit 22f is composed of a nonvolatile memory, the memory circuit 22f retains a control signal even if supply of power to the memory circuit 22f is stopped. Therefore, the setting of the light emitting module 2 based on the control signal can be maintained.

In addition, in the case where a control signal is composed of a pulse train, conventionally, since a control signal is superimposed onto supply power to each light emitting module, high-power switching for the processing is needed, and energy loss increases. However, in the present embodiment, since a control signal is transmitted via the communication lines, the power level of a control signal decreases. Therefore, energy loss hardly occurs in the switching operations needed for generating a control signal.

The light emitting module device 1 according to the second embodiment may be provided in the lighting apparatus 10 shown in FIG. 4. The communication lines 5 (not shown in FIG. 4) are contained in the lighting apparatus case 12.

Variation of Second Embodiment

Figure 14:
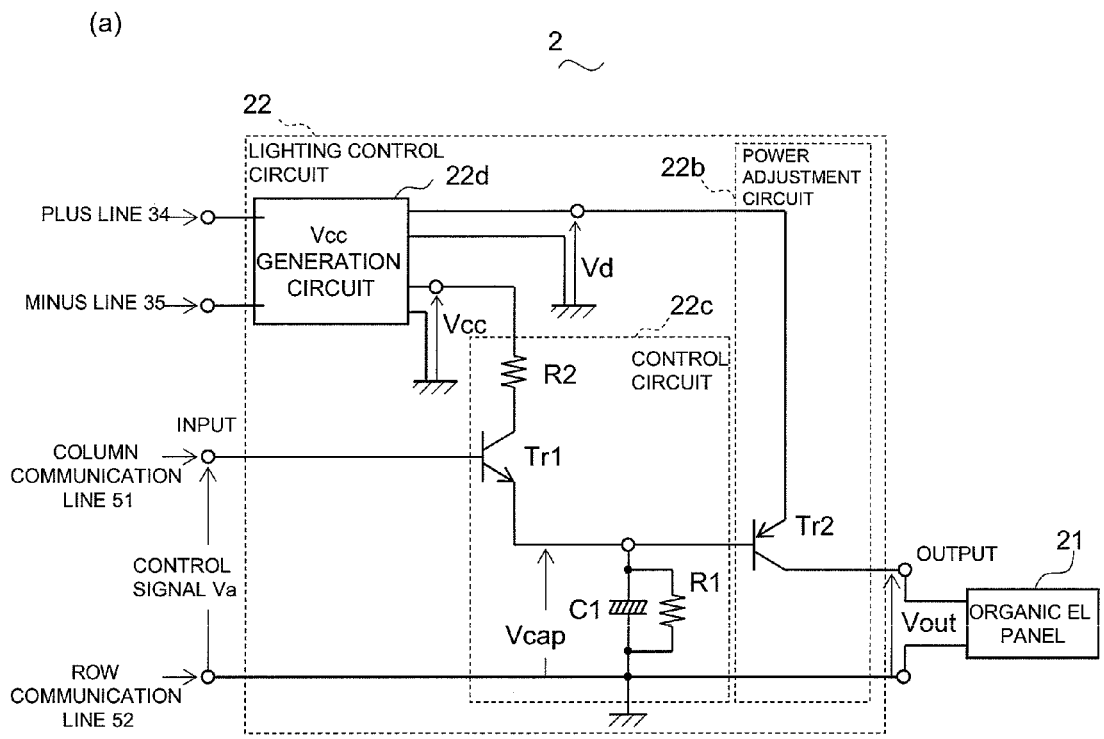
FIG. 14(a) is a circuit diagram of a light emitting module of a light emitting module device according to a variation of the second embodiment.
FIG. 14(b) shows the voltage waveforms at various sections of the circuits.
Figure 14:
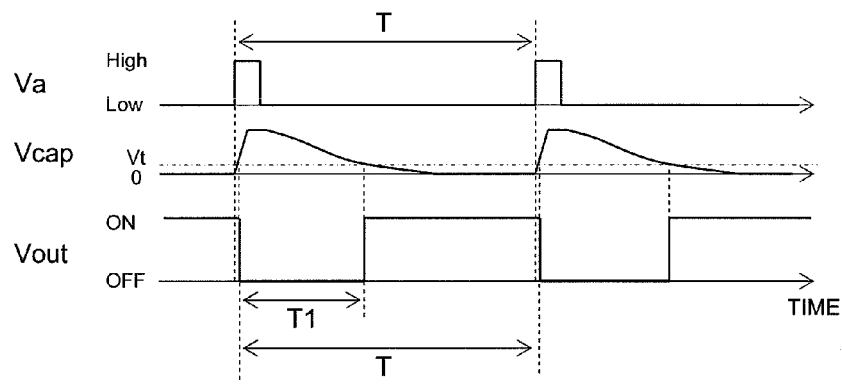

FIG. 14(a) shows the circuit configuration of the light emitting module 2 according to a variation of the second embodiment, and FIG. 14(b) shows the voltage waveforms at various sections of the circuit. In the present variation, the control circuit 22c of the lighting control circuit 22 of the light emitting module 2 includes a charge/discharge circuit (memory unit) in place of the CPU 22e and the memory circuit 22f of the second embodiment. The charge/discharge circuit retains a control signal Va inputted from the signal generation circuit 43 during a predetermined retaining period. The charge/discharge circuit controls the operation of the power adjustment circuit 22b, based on the control signal Va stored in the charge/discharge circuit, thereby adjusting an output voltage Vout to the organic EL panel 21. The charge/discharge circuit is volatile, so that if the retaining period has passed, the charge/discharge circuit loses the control signal. After the signal generation circuit 43 transmits a control signal to the light emitting module 2, the signal generation circuit 43 transmits the next control signal before the retaining period has passed, thereby preventing the control circuit 22c from losing a control signal. That is, a transmission cycle T of transmitting a control signal to the light emitting module 2 is set in advance to be substantially equal to the retaining period.

The control circuit 22c includes: a capacitor C1; a transistor Tr1 which charges and discharges the capacitor C1 in accordance with the control signal Va; and resistors R1 and R2 which adjust the charging period and the discharging period of the capacitor C1. The power adjustment circuit 22b is composed of a transistor Tr2 to which a charge/discharge voltage Vcap of the capacitor C1 is applied as an input signal. The power adjustment circuit 22b performs PWM control for the output voltage Vout to the organic EL panel 21 in accordance with the charge/discharge voltage Vcap.

The control signal Va is composed of a PWM signal having two values of High and Low, and is inputted to the base of the transistor Tr1. The capacitor C1 is connected to the collector of the transistor Tr1, and is grounded. The resistor R1 is connected in parallel to the capacitor C1. The resistor R2 is connected to the emitter of the transistor Tr1. The drive voltage Vcc for charging the capacitor C1 is applied to the emitter of the transistor Tr1 via the resistor R2 by the Vcc generation circuit 22d. The organic EL panel 21 is connected to the collector of the transistor Tr2. A drive voltage Vd for driving the organic EL panel 21 is applied to the emitter of the transistor Tr2 by the Vcc generation circuit 22d.

When the potential of the control signal Va is High, the transistor Tr1 is in a conductive state, the drive voltage Vcc is divided by the resistor R2, and the resultant voltage is applied to the capacitor C1. The capacitor C1 is charged with the electric charge corresponding to the pulse width of the control signal Va. Here, the resistance values of the resistors R1 and R2 are defined as r1 and r2, respectively. The charged capacitor C1 discharges with a time r1/r2 times as long as the charging time. The value of r1/r2 is determined depending on the period of scanning the organic EL panels 21 of all the light emitting module 2, that is, the transmission cycle T of the control signal. This period is from when the light emitting module 2 receives a control signal until the light emitting module 2 receives another control signal in the next cycle. In the case where the number of the light emitting module 2 is sixteen, it is desirable that the value of r1/r2 is 16, for example.

The transistor Tr2 is in a conductive state only when the charge/discharge voltage Vcap of the capacitor C1 is smaller than a predetermined threshold value Vt. Therefore, the waveform of the output voltage Vout to the light emitting module 2 is a PWM signal waveform having an OFF period of T1 and an ON period of (T−T1) in the transmission cycle T of a control signal. The organic EL panel 21 is operated based on the signal having this waveform.

The control circuit 22*c* of the present variation performs PWM control for an output signal to the light emitting module 2, based on the control signal Va from the signal generation circuit 43. The period of the output signal is extended by the charge/discharge function of the memory circuit 22*f*, so that the period becomes substantially equal to the transmission cycle T of the control signal from the signal generation circuit 43. Therefore, it can be considered that the control circuit 22*c* retains a control signal during the transmission cycle T. Thus, the control circuit 22*c* which retains the control signal can be composed of a charge/discharge circuit having a simple configuration, and therefore, the cost is reduced.

Third Embodiment

Figure 15:
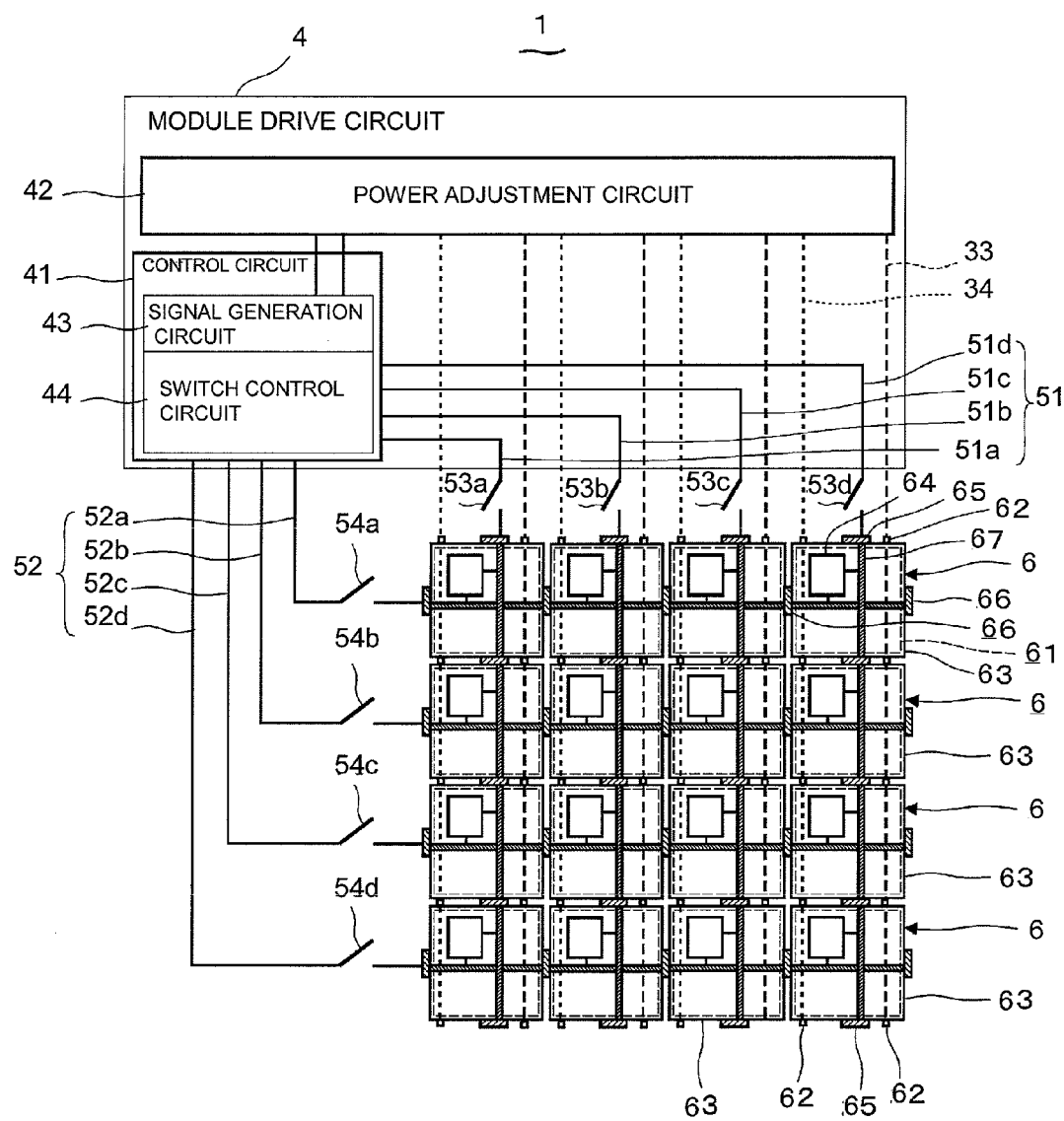
FIG. 15 is a circuit diagram of a light emitting module device according to the third embodiment of the present invention.
Figure 16:
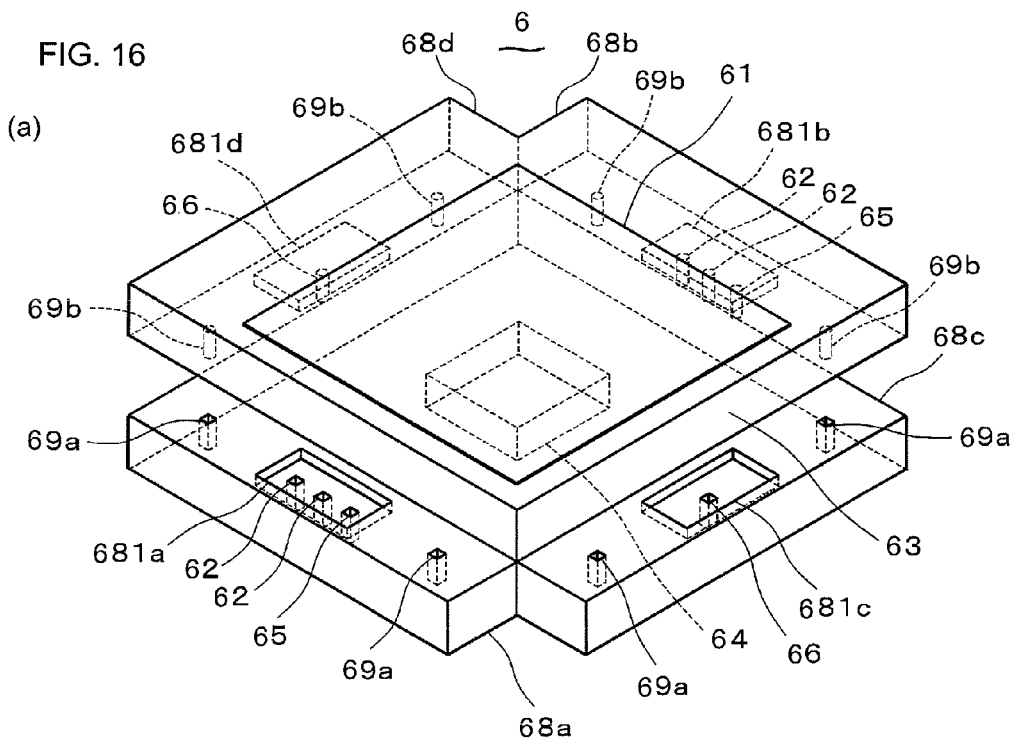
FIG. 16(a) is a perspective view of the light emitting module of the light emitting module device, as seen from the light radiating side.
FIG. 16(b) shows a perspective view of the light emitting module, as seen from the side opposite to the light radiating side.
Figure 16:
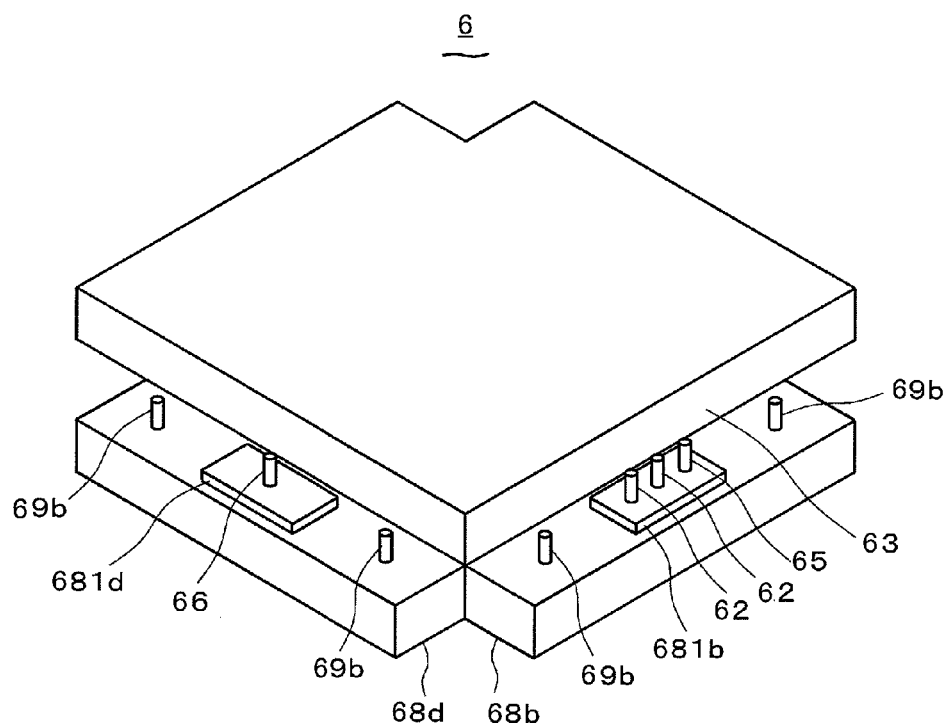
Figure 17:
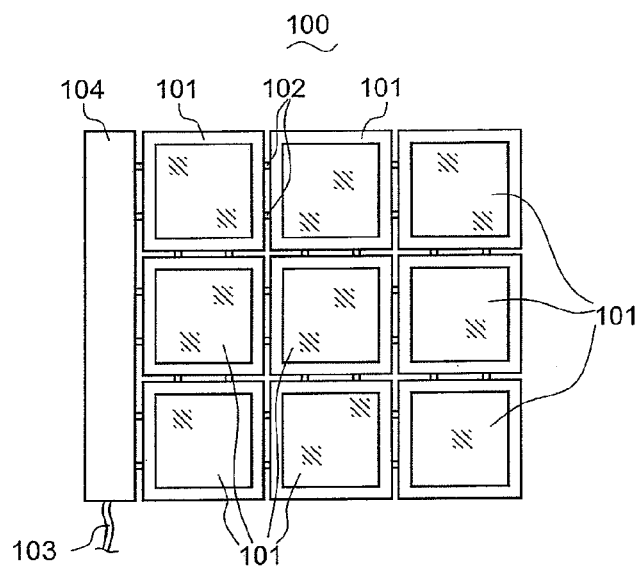
FIG. 17 is a front view of a conventional light emitting module device.
Figure 18:
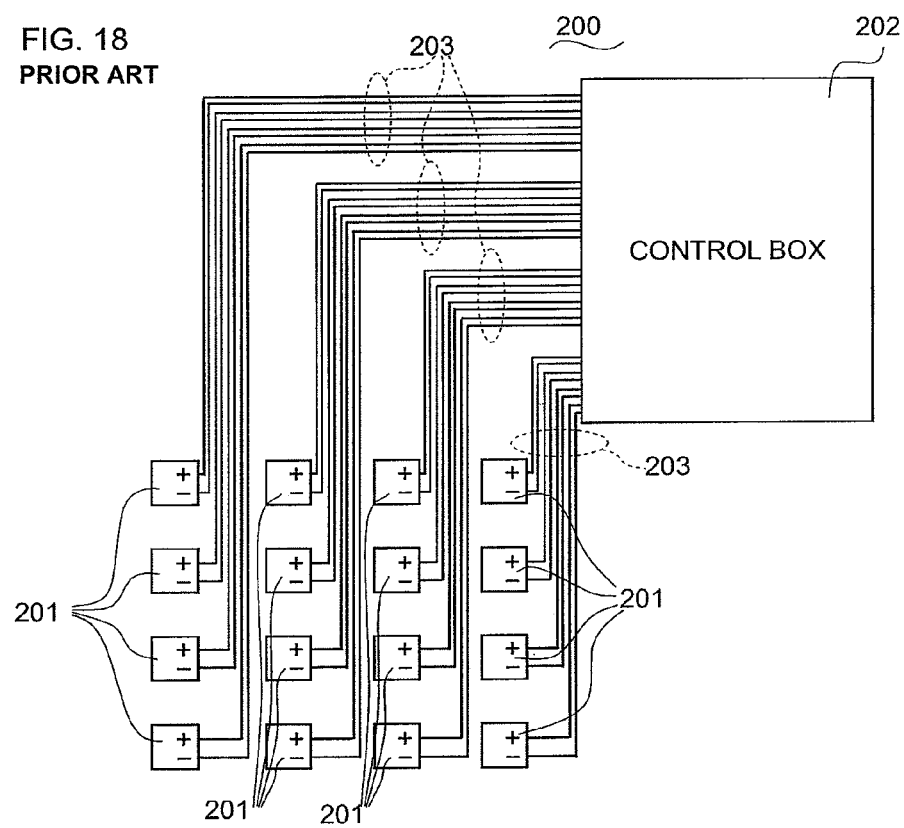
FIG. 18 shows the circuit configuration of another conventional light emitting module device.
Figure 19:
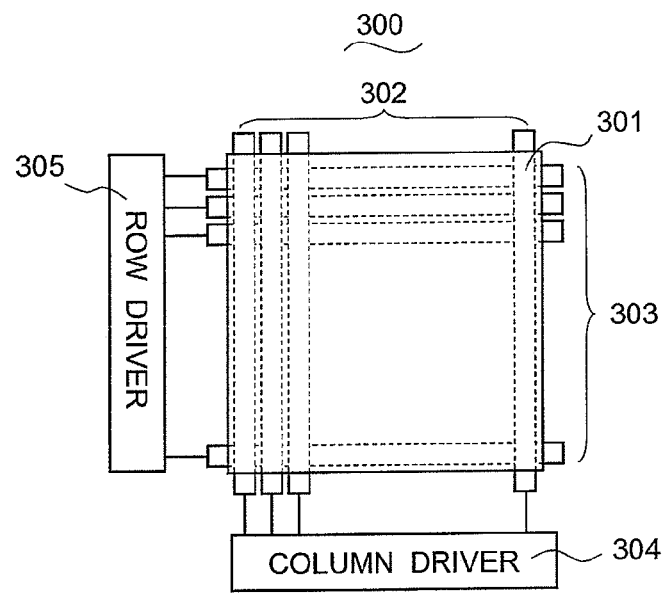
FIG. 19 is a circuit diagram of a conventional plasma display.
Figure 20A:
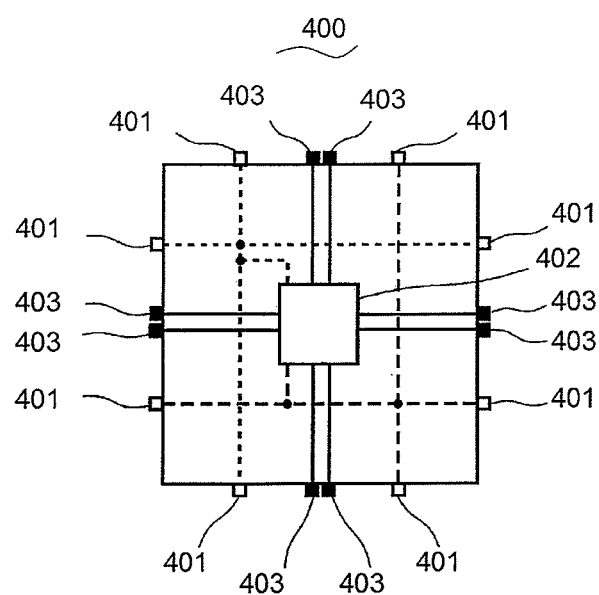
FIG. 20(a) shows the configuration of a conventional light emitting module.
Figure 20B:
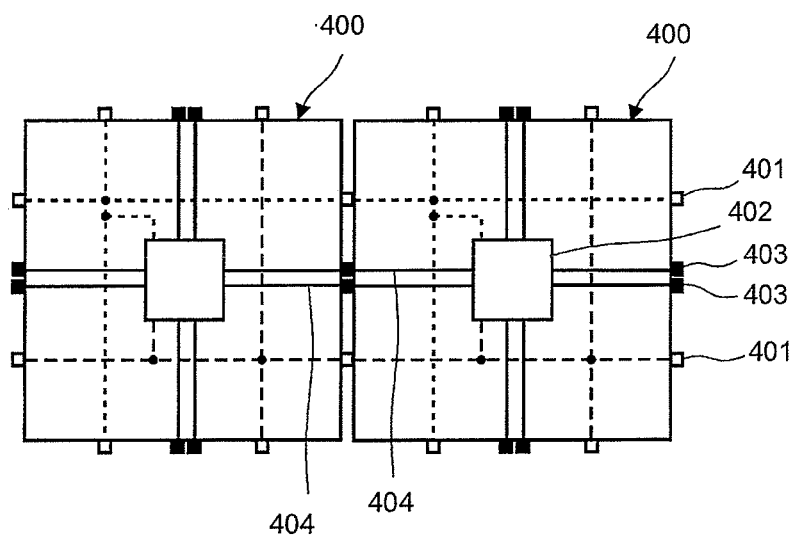
FIG. 20(b) shows the light emitting modules arranged so as to be adjacent to each other.

FIG. 15 shows the configuration of a light emitting module device according to the third embodiment of the present invention, and FIGS. 16(*a*) and 16(*b*) show the configuration of a light emitting module used in the light emitting module device. The light emitting module device 1 of the present embodiment includes light emitting modules 6 in place of the light emitting module 2 in the light emitting module device 1 of the second embodiment, and the other components of the present embodiment are the same as those of the second embodiment.

The light emitting module 6 includes a planar light emitting device 61, feed terminals 62, a rectangle panel 63, a lighting control circuit 64, a plurality of communication positive terminals 65, and a plurality of communication negative terminals 66. The planar light emitting device 61 has a light emitting layer sandwiched between the electrodes thereof. The feed terminals 62 as a pair of terminals are connected to the output terminals of the power adjustment circuit 42 (feed unit) via the plus line 33 and the minus line 34. In addition, the feed terminals 62 are connected to the electrodes of the planar light emitting device 61, whereby power from the power adjustment circuit 42 is supplied to the planar light emitting device 61. The planar light emitting device 61 and the feed terminals 62 are provided to the panel 63. The lighting control circuit 64 (control unit) has a configuration equivalent to that of the lighting control circuit 22 of the second embodiment. The lighting control circuit 64 receives a control signal transmitted from the module drive circuit 4, and controls current conduction to the planar light emitting device 61 in accordance with the received control signal, thereby controlling the light emission of the planar light emitting device 61. The communication positive terminals 65 and the communication negative terminals 66 are used for the lighting control circuit 64 to receive a control signal.

The communication positive terminal 65 is placed at each of two sides of the panel 63 that are opposite to each other, and the communication negative terminal 66 is placed at each of the other two sides that are opposite to each other, such that, when the panels 63 are arranged such that a plurality of the light emitting modules 6 are adjacent to each other, the terminals, having the same polarity, of the respective light emitting modules 6 are connected to each other. The communication positive terminal 65 and the communication negative terminal 66, having different polarities are respectively placed at two adjacent sides of the panel 63. In the light emitting modules 6, the communication positive terminals 65 are connected to each other and the communication negative terminals 66 are connected to each other, by a conduction pattern 67 formed in the panel 63. Communication paths are formed between the adjacent light emitting modules 6 by the connection among the communication positive terminals 65, the communication negative terminals 66, and the conduction pattern 67.

Each of the column communication lines 51 connects the signal generation circuit 43 to the communication positive terminals 65 of the light emitting module 6 at one end of the column corresponding to the column communication line 51. Each of the row communication lines 52 connects the signal generation circuit 43 to the communication negative terminals 66 of the light emitting module 6 at one end of the row corresponding to the row communication line 52.

Next, the configuration of the light emitting module 6 will be further described in detail with reference to FIGS. 16(*a*) and 16(*b*). The planar light emitting device 61 is composed of an organic EL device, and is provided substantially at the center of one surface of the panel 63. The lighting control circuit 64 is provided inside the panel 63.

The panel 63 is formed by molding with resin, for example, and has extending portions 68*a*, 68*b*, 68*c*, and 68*d* that extend from the respective sides of the rectangle. The extending portions 68*a* and 68*b* are provided at two sides of the panel 63 that are opposite to each other, and the extending portions 68*c* and 68*d* are provided at the other two sides that are opposite to each other. The extending portions 68*a* and 68*b* are formed such that, when a plurality of the panels 63 are arranged so as to be adjacent to each other, the extending portion 68*a* of each panel 63 overlaps with the extending portion 68*b* of the adjacent panel 63 in the thickness direction. The extending portions 68*c* and 68*d* are also formed in the same fashion.

The extending portion 68*a* has a dent 681*a*, and the extending portion 68*b* has a protrusion 681*b* having a shape corresponding to the dent 681*a*. The female terminal of the communication positive terminal 65, and the female terminals of a pair of the feed terminals 62 are provided in the dent 681*a*. The male terminal of the communication positive terminal 65, and the male terminals of the pair of the feed terminals 62 are provided on the protrusion 681*b*. When a plurality of the panels 63 are arranged so as to be adjacent to each other, the dent 681*a* of each panel 63 is engaged with the protrusion 681*b* of the adjacent panel 63, whereby the male terminals and the female terminals are connected. When external force is applied to the panel 63, stress applied to the male terminals is decreased owing to the engagement between the dent 681*a* and the protrusion 681*b*. Therefore, the reliability of the terminals improves. Similarly, the extending portion 68*c* has a dent 681*c*, and the extending portion 68*d* has a protrusion 681*d*. The female terminal of the communication negative terminals 66 is provided in the dent 681*c*, and the male terminal of the communication negative terminals 66 is provided on the protrusion 681*d*. Since three male terminals are provided on the protrusion 681*b*, and one female terminal is provided in the dent 681*c*, the protrusion 681*b* and the dent 681*c* cannot be engaged with each other. Therefore, erroneous connection between terminals are prevented. Erroneous connection between terminals may be prevented by providing the dent 681a and the dent 681c having different shapes.

The panel 63 has fixing concave portions 69a formed in the extending portion 68a and 68c, and fixing convex portions 69b formed on the extending portions 68b and 68d. When a plurality of the panels 63 are fixed to each other, the fixing concave portions 69a and the fixing convex portions 69b are engaged with each other.

In the present embodiment, when a plurality of the light emitting modules 6 are arranged so as to be adjacent to each other, the communication positive terminals 65 of the respective light emitting modules 6 are connected to each other, and the communication negative terminals 66 of the respective light emitting modules 6 are connected to each other, whereby communication paths are formed among a plurality of the light emitting modules 6. Therefore, a control signal transmitted from the control circuit 41 can be transmitted to a plurality of the light emitting modules 6 via the communication paths, and thus, the number of lines through which the control signal is transmitted can be reduced. Moreover, in the case where the light emitting modules 6 are arranged in a grid-like fashion, the communication paths are formed in a grid-like fashion. Therefore, the number of lines can be reduced in comparison with the case where communication paths are formed by star topology. In addition, since one of the communication positive terminals 65 or one of the communication negative terminals 66 is provided at each side of the panel 63, the number of terminals can be reduced in comparison with the case where a pair of a positive terminal and a negative terminal are provided at each side of a panel, and therefore, the production cost of the light emitting module 6 is reduced.

It is noted that the present invention is not limited to the configurations of the first to third embodiments and the variations thereof, but numerous other variations can be devised in accordance with the intended use. For example, the light emitting module 2 may be arranged in an array. The control signals for the light emitting module 2 may be transmitted in a random manner, instead of transmitting the control signals in the arrangement order of the light emitting modules. The control signal may be composed of digital transmission data generated by an asynchronous serial communication circuit such as a UART (Universal Asynchronous Receiver Transmitter). Instead of providing the power adjustment circuit 42, power is directly supplied from an external power supply to the light emitting module 2 or the control circuit 41.

In addition, in the first embodiment, the control signal may be composed of an analog value. The switches 31 and the switches 32 may be provided in the control circuit 41. The plus line 33 may be the row power line, and the minus line 34 may be the column power line. In the second embodiment, the switches 53 and the switches 54 may be provided in the control circuit 41. A circuit having a configuration equivalent to that of the memory unit of the variation of the second embodiment is provided at the preceding stage of the CPU 22e, and an output from the circuit may be inputted as a control signal to the CPU 22e. In the first and second embodiments, a light emitting source of the light emitting module 2 may be a light emitting module, an incandescent lamp, or a fluorescent lamp. Any light emitting source may be used as long as the operation thereof can be controlled through signal communication.

The present application is based on Japanese Patent Application No. 2009-221012, Japanese Patent Application No. 2009-221025, and Japanese Patent Application No. 2009-221039. The content of the present application is consequently incorporated herein by reference to the specifications and the drawings of the above patent applications.

Although the present invention has been sufficiently described in the embodiments with reference to the accompanying drawings, it is obvious to a person of ordinary skills in the art that other modifications and variations can be devised. Therefore, it should be understood that such modifications and variations are included in the scope of the present invention without departing from the scope of the present invention.

DESCRIPTION OF THE REFERENCE CHARACTERS

1 light emitting module device
2 light emitting module
22 lighting control circuit (control unit)
26 control unit (composing memory unit)
26f memory circuit (composing memory unit)
3 power line
31, 32 switch
31a to 31d column switch
32a to 32d row switch
33a to 33d column power line
34a to 34d row power line
42 power adjustment circuit (feed unit)
43 signal generation circuit (signal generation unit)
5 communication line
51, 51a to 51d column communication line
52, 52a to 52d row communication line
53, 53a to 53d column switch
54, 54a to 54d row switch
6 light emitting module
61 planar light emitting device
62 feed terminal
63 panel
64 control circuit (control unit)
65 communication positive terminal (positive terminal)
66 communication negative terminal (negative terminal)
10 lighting apparatus

The invention claimed is:

1. A light emitting module device comprises:
a plurality of light emitting modules;
a power line through which supply power needed for the plurality of light emitting modules to emit light is supplied to the plurality of light emitting modules; and
a signal generation unit which generates a control signal for setting the corresponding light emitting module, wherein
the power line is shared by the plurality of light emitting modules, the power line has switches which turn on or off current conduction to each of the plurality of light emitting modules through open/close operations,
the signal generation unit generates a signal for controlling the switches such that the switches are individually opened or closed,
in the open/close control, a light-emission period and an extinction period are provided,
in the light-emission period, the corresponding switch is closed to cause the corresponding light emitting module to emit light,
in the extinction period, the corresponding light emitting module is extinguished, and if there is a control signal to be transmitted to the light emitting module, the corresponding switch is opened or closed, whereby the control signal is superimposed onto the supply power, and each of the plurality of light emitting modules has a control unit which reads the control signal superimposed onto the supply power and which controls the light emitting module such that the light emitting module is lit up based on the read control signal.

2. The light emitting module device according to claim 1, wherein in the open/close control for the switches by the signal generation unit, a communication period is provided in place of the extinction period, and in the communication period, the corresponding light emitting module is caused to emit light, and if there is a control signal to be transmitted to the light emitting module, the corresponding switch is opened or closed, whereby the control signal is superimposed onto the supply power.

3. The light emitting module device according to claim 2, wherein each of the control units of the plurality of light emitting modules is configured such that if the supply power is stopped during a predetermined period or longer, setting of the control unit is reset, and the communication period is a predetermined period after the setting of the control unit is reset and supply of the supply power is restarted.

4. The light emitting module device according to claim 3, wherein the plurality of light emitting modules are arranged in an array or in a matrix, the power line comprises:

column power lines each of which is shared by the light emitting modules at the corresponding column; and row power lines each of which is shared by the light emitting modules at the corresponding row, the switches are provided on the respective column power lines and the respective row power lines, and the signal generation unit opens or closes the switches corresponding to the column and the row at which the light emitting module to be controlled is present, thereby superimposing the control signal onto the supply power to the light emitting module.

5. The light emitting module device according to claim 2, wherein the plurality of light emitting modules are arranged in an array or in a matrix, the power line comprises:

column power lines each of which is shared by the light emitting modules at the corresponding column; and row power lines each of which is shared by the light emitting modules at the corresponding row, the switches are provided on the respective column power lines and the respective row power lines, and the signal generation unit opens or closes the switches corresponding to the column and the row at which the light emitting module to be controlled is present, thereby superimposing the control signal onto the supply power to the light emitting module.

6. The light emitting module device according to claim 1, wherein the plurality of light emitting modules are arranged in an array or in a matrix, the power line comprises:

column power lines each of which is shared by the light emitting modules at the corresponding column; and row power lines each of which is shared by the light emitting modules at the corresponding row, the switches are provided on the respective column power lines and the respective row power lines, and the signal generation unit opens or closes the switches corresponding to the column and the row at which the light emitting module to be controlled is present, thereby superimposing the control signal onto the supply power to the light emitting module.

7. A lighting apparatus comprising the light emitting module device according to claim 1.

8. A light emitting module device comprises:

a plurality of light emitting modules;

a signal generation unit which generates a control signal for controlling the corresponding light emitting module; and a communication line through which the control signal is transmitted from the signal generation unit to the corresponding light emitting module, wherein the plurality of light emitting modules are arranged in an array or in a matrix, each of the plurality of light emitting modules has a control unit which receives the control signal from the signal generation unit and which controls the light emitting module such that the light emitting module is lit up based on the received control signal, the communication line has column communication lines each of which is shared by the light emitting modules at the corresponding column, and row communication lines each of which is shared by the light emitting modules at the corresponding row, the column communication lines and the row communication lines each has a switch which, through open/close operation, causes the corresponding one of the column communication lines and the row communication lines to be in a conductive state/non-conductive state, and the signal generation unit controls the open/close operations of the switches, thereby causing the column communication line and the row communication line for the light emitting module that is to be controlled, to be in conductive states, and causing the other column communication lines and the other row communication lines to be in non-conductive states, and transmits the control signal to the light emitting module to be controlled.

9. The light emitting module device according to claim 8, wherein the signal generation unit temporally changes the opened/closed states of the switches, thereby sequentially causing the plurality of light emitting modules to be electrically connected to the signal generation unit, and sequentially transmits the control signals to the plurality of light emitting modules electrically connected to the signal generation unit.

10. The light emitting module device according to claim 9, wherein each of the plurality of light emitting modules comprises a memory unit which retains the control signal transmitted from the signal generation unit, until the next control signal is received.

11. The light emitting module device according to claim 8, wherein each of the plurality of light emitting modules comprises a memory unit which retains the control signal transmitted from the signal generation unit, until the next control signal is received.

12. The light emitting module device according to claim 11, wherein
the memory unit comprises a nonvolatile memory.

13. The light emitting module device according to claim 11, wherein
the memory unit is volatile, so that if a predetermined retaining period has passed after the memory unit stores the control signal, the memory unit loses the control signal, and
after the signal generation unit transmits the control signal, the signal generation unit transmits the next control signal before the predetermined retaining period has passed.

14. A lighting apparatus comprising the light emitting module device according to claim 8.

15. A light emitting module comprises:
a planar light emitting device having a light emitting layer sandwiched between the electrodes thereof;
feed terminals which are connected to the electrodes and through which power is supplied to the planar light emitting device;
a rectangular panel to which the planar light emitting device and the feed terminals are provided;
a control unit which receives a control signal, given from the outside, for controlling current conduction to the planar light emitting device, and which controls light emission of the planar light emitting device, based on the control signal; and
a plurality of positive terminals for communication and a plurality of negative terminals for communication, through which the control signal for the control unit is received, wherein
the plurality of positive terminals are placed at each of two sides of the panel that are opposite to each other, and the plurality of negative terminal placed at each of the other two sides that are opposite to each other, such that, when a plurality of the panels are arranged such that a plurality of the light emitting modules are adjacent to each other, the positive terminals of the respective light emitting modules are connected to each other, and the negative terminals of the respective light emitting modules are connected to each other.

16. The light emitting module according to claim 15, wherein
the positive terminals and the negative terminals, having different polarities, are respectively placed at two adjacent sides of the panel.

17. A light emitting module device comprises:
a plurality of the light emitting modules according to claim 16;
a signal generation unit which transmits the control signal to the control unit; and
a feed unit which is connected to the feed terminals and supplies power from an external power supply to the plurality of light emitting modules,
wherein the plurality of light emitting modules are arranged in a grid-like so as to form rows and columns,
the light emitting modules further comprises:
communication lines for row each of which connects the signal generation unit to the light emitting modules at the corresponding row;
communication lines for column each of which connects the signal generation unit to the light emitting modules at the corresponding column; and
switches which cause the respective communication lines to be in conductive states/non-conductive states, through open/close operations,
wherein the signal generation unit controls the opened/closed states of the switches, thereby selecting at least one of the plurality of light emitting modules, and transmits the control signal to the selected light emitting module.

18. The light emitting module device according to claim 17, wherein
the signal generation unit temporally changes the opened/closed states of the switches, thereby sequentially changing the light emitting module that is electrically connected to the signal generation unit, and transmits the control signals to the light emitting module electrically connected to the signal generation unit.

19. A lighting apparatus comprising the light emitting module device according to claim 17.

* * * * *